(12) United States Patent
Kamei et al.

(10) Patent No.: US 11,428,423 B2
(45) Date of Patent: Aug. 30, 2022

(54) HUMIDIFIER AND AIR COMPOSITION ADJUSTMENT DEVICE

(71) Applicant: DAIKIN INDUSTRIES, LTD., Osaka (JP)

(72) Inventors: Noritaka Kamei, Osaka (JP); Naohiro Tanaka, Osaka (JP); Hidenori Matsui, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 17/074,262

(22) Filed: Oct. 19, 2020

(65) Prior Publication Data

US 2021/0033295 A1  Feb. 4, 2021

Related U.S. Application Data

(63) Continuation of application No. PCT/JP2019/018264, filed on May 7, 2019.

(30) Foreign Application Priority Data

May 7, 2018  (JP) .............................. JP2018-089111

(51) Int. Cl.
  *F24F 6/14* (2006.01)
  *B01D 53/22* (2006.01)
  *B01D 53/26* (2006.01)
  (Continued)

(52) U.S. Cl.
  CPC .............. *F24F 6/14* (2013.01); *B01D 53/229* (2013.01); *B01D 53/265* (2013.01); *F24F 13/22* (2013.01);
  (Continued)

(58) Field of Classification Search
  CPC .......... F24F 6/14; F24F 13/22; B01D 53/229; B01D 53/265; F25D 2317/04131; F25D 11/00
  See application file for complete search history.

(56) References Cited

U.S. PATENT DOCUMENTS 5,042,266 A   8/1991  Yamashita et al.
5,127,233 A   7/1992  Coffield
            (Continued)

FOREIGN PATENT DOCUMENTS

CA     2055806 A1   6/1992
CN    102216705 A   10/2011
            (Continued)

OTHER PUBLICATIONS

International Search Report (PCT/ISA/210) issued in PCT/JP2019/018264, dated Jul. 23, 2019.
(Continued)

*Primary Examiner* — Elizabeth J Martin
(74) *Attorney, Agent, or Firm* — Birch, Stewart, Kolasch & Birch, LLP

(57) ABSTRACT

A humidifier cools air in an air path that supplies the air to an internal space of a storage chamber such as a container or a warehouse, extracts water in a water extracting unit, stores the extracted water in a humidifying unit, and humidifies the internal space. The air path includes a main path that communicates with the internal space and a discharge path that discharges a part or all of water-extraction air to the outside of the target space, so that the humidifier can sufficiently humidify the internal space without receiving supply of water.

16 Claims, 18 Drawing Sheets

(51) Int. Cl.
*F24F 13/22* (2006.01)
*F25D 11/00* (2006.01)
(52) U.S. Cl.
CPC .... *F25D 11/00* (2013.01); *F25D 2317/04131* (2013.01)

(56) References Cited

U.S. PATENT DOCUMENTS

| | | | |
|---|---|---|---|
| 7,685,829 | B2 | 3/2010 | Mueller et al. |
| 2007/0000275 | A1* | 1/2007 | Li .................... F24F 5/001 62/310 |
| 2009/0079098 | A1* | 3/2009 | Ezra .................... F24F 3/14 261/128 |
| 2013/0233697 | A1* | 9/2013 | Bryant .................... B01D 1/14 203/11 |
| 2018/0213808 | A1 | 8/2018 | Kamei et al. |
| 2020/0253226 | A1 | 8/2020 | Kamei et al. |

FOREIGN PATENT DOCUMENTS

| | | |
|---|---|---|
| CN | 105757912 A | 7/2016 |
| EP | 0 489 413 A1 | 6/1992 |
| JP | 60/194271 * | 10/1985 |
| JP | 60-194271 A | 10/1985 |
| JP | 1-70077 U | 5/1989 |
| JP | 1-217174 A | 8/1989 |
| JP | 4-278046 A | 10/1992 |
| JP | 4-278047 A | 10/1992 |
| JP | 6-257805 A | 9/1994 |
| JP | 2002-274608 A | 9/2002 |
| JP | 2004-309085 A | 11/2004 |
| JP | 2014-012432 A | 1/2014 |
| JP | 2016-161191 A | 9/2016 |
| JP | 2019-150812 A | 9/2019 |
| WO | WO 2008/000921 A1 | 1/2008 |
| WO | WO 2009/037676 A2 | 3/2009 |
| WO | WO 2017/038038 A1 | 3/2017 |

OTHER PUBLICATIONS

Extended European Search Report dated Apr. 14, 2021 in corresponding European Application No. 19800548.0.
Extended European Search Report dated Jun. 27, 2022 in corresponding European Application No. 22165849.5.

* cited by examiner

HUMIDIFIER AND AIR COMPOSITION ADJUSTMENT DEVICE

CROSS REFERENCE TO RELATED APPLICATIONS

This application is a Continuation of PCT International Application No. PCT/JP2019/018264, filed on May 7, 2019, which claims priority under 35 U.S.C. 119(a) to Patent Application No. 2018-089111, filed in Japan on May 7, 2018, all of which are hereby, expressly incorporated by reference into the present application.

TECHNICAL FIELD

The present disclosure relates to a humidifier and an air composition adjustment device.

BACKGROUND ART

Among humidifiers for humidifying the internal space (target space) of a storage chamber such as a container or a warehouse, there is a humidifier that cools compressed air in a path that supplies the compressed air to the internal space, that stores water generated by cooling the air in a tank, and that humidifies the internal space by using the water (see, for example, PTL 1). The compressed air is used as water-extraction air from which water is to be extracted.

CITATION LIST

Patent Literature

PTL 1: Japanese Unexamined Patent Application Publication No. 4-278046

SUMMARY

According to a first aspect of the present disclosure, a humidifier for humidifying a target space (201) includes:

an air path (220) through which water-extraction air flows, a cooling unit (240) that cools the water-extraction air in the air path (220), a water extracting unit (250) that extracts water that is generated when the water-extraction air is cooled by the cooling unit (240) in the air path (220), and a humidifying unit (260) that humidifies the target space (201) by using the water extracted by the water extracting unit (250); and the air path (220) includes a main path (221, 222, 263) that communicates with the target space (201) and a discharge path (223) that discharges a part or all of the water-extraction air to the outside of the target space (201).

DESCRIPTION OF EMBODIMENTS

Embodiments will be described in detail with reference to the drawings.

First Embodiment

Figure 1:
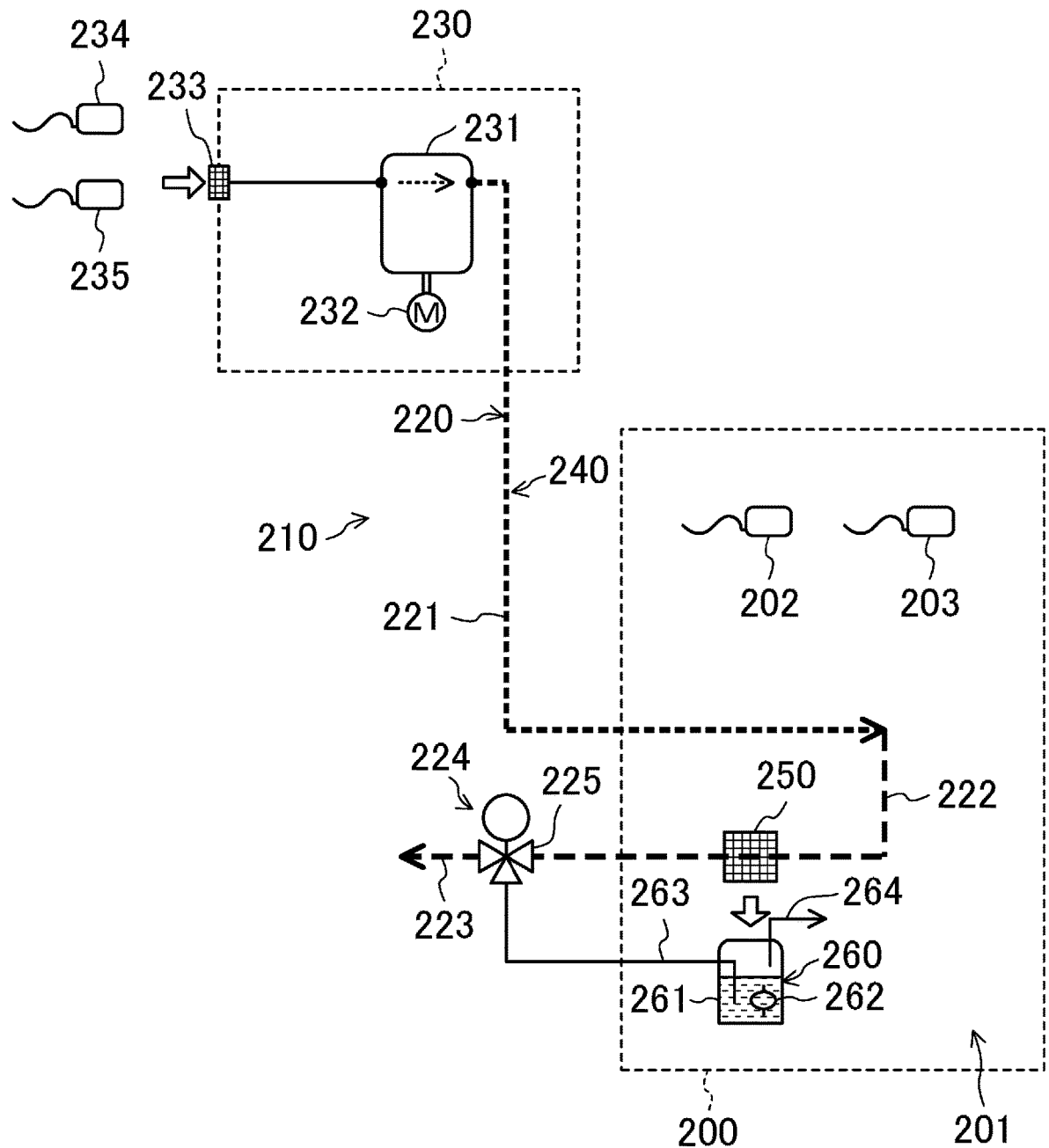
FIG. 1 is a schematic diagram of a humidifier according to a first embodiment.

FIG. 1 illustrates a humidifier (210) according to a first embodiment. The humidifier (210) is a device for humidifying an internal space (201), which is a target space, of a storage chamber (200) such as a container or a warehouse. The humidifier (210) includes an air path (220), a compressing unit (230), a cooling unit (240), a water extracting unit (250), and a humidifying unit (260).

The air path (220) is a path in which water-extraction air (external air, which is air outside of the internal space (201) in the present embodiment) flows. The air path (220) is typically constituted by a pipe or a tube.

The compressing unit (230) is provided near an external air inlet of the air path (220). The compressing unit (230) is a pump unit having an air pump (231) for compressing external air. The air pump (231) is driven by a pump motor (232). The compressing unit (230) has an air filter (233) at the external air inlet of the air path (220). Outside of the compressing unit (230), an external air humidity sensor (234) and an external air temperature sensor (235) are provided near the air inlet.

The cooling unit (240) cools water-extraction air in the air path (220). In the present embodiment, an external path (221), which is a part of the air path (220) that is provided outside of the storage chamber (200), is configured as the cooling unit (240). Compressed external air discharged from the air pump (231) has a high temperature (for example 100°

C.), and the air is cooled by external air while passing through the external path (221).

The water extracting unit (250), which is disposed in the internal space (201) of the storage chamber (200), is configured to extract water that is generated by cooling water-extraction air in the cooling unit (240). The water extracting unit (250) is constituted by, for example, a commercially available water removing filter. The water removing filter extracts water from air that passes through the water removing filter. The water extracting unit (250) is provided in an internal path (222), which is a part of the air path (220) that passes through the internal space (201).

Water that is extracted by the water extracting unit (250) is supplied to the humidifying unit (260), which is provided in the internal space (201) as with the water extracting unit (250). The humidifying unit (260) includes a water tank (261) and a level sensor (262). In the water tank (261), an air-supply path (263) and a humidifying nozzle (264) are provided. The humidifying unit (260) humidifies the internal space (201) via the humidifying nozzle (264) by using water that is supplied to the water tank (261) from the water extracting unit (250). In the internal space (201), an internal humidity sensor (202) and an internal temperature sensor (203) are provided.

The air path (220) has a discharge path (223) that discharges external air from the internal path (222) to the outside of the internal space (201). In the discharge path (223), a three-way valve (225) (a switching valve (224)) is provided. A first port and a second port of the three-way valve (225) are connected to the discharge path (223), and a third port of the three-way valve (225) is connected to the air-supply path (263). The air path (220) has a main path that includes the external path (221), the internal path (222), and the air-supply path (263). The three-way valve (225) switches flow of external air between flow to the air-supply path (263) of the main path and flow from the main path to the discharge path (223). The main path is a path that communicates from an external air inlet to the internal space (201), and the discharge path (223) is a path that discharges a part or all of external air to the outside of the internal space (201).

When the humidity of the internal space (201) is lower than a predetermined value, the switching valve (224) is switched so that airflow in the air path (220) is directed toward the air-supply path (263) of the main path. When the humidity of the internal space (201) is higher than or equal to the predetermined value, the switching valve (224) is switched so that airflow in the air path (220) is directed toward the discharge path (223) and air is discharged to the external space.

<Operation>

In the humidifier (210), when the air pump (231) is activated, external air is sucked into the air pump (231) through the air filter (233) provided at the inlet of the air path (220). The air pump (231) pressurizes and discharges the external air. The pressurized external air flows through the external path (221). The pressurized air has a high temperature (for example 100° C.), which is higher than the temperature of external air. Therefore, the high-temperature external air that flows through the external path (221) is cooled by air around the external path (221). When the high-temperature external air that flows through the external path (221) is cooled, water vapor in the air condenses into water, and the external air and the water flow in the external path (221).

External air and water that flow through the external path (221) flow into the internal path (222). The water extracting unit (250) is provided in the internal path (222), and water in air is extracted and stored in the water tank (261) of the humidifying unit (260). External air that has passed through the water extracting unit (250) flows to the discharge path (223). When storing water in the humidifying unit (260) (when performing a water storing operation), the switching valve (224) is switched so that the internal path (222) and the discharge path (223) communicate with each other. For example, a part or all of air that has passed through the water extracting unit (250) is discharged to the external space. Therefore, the pressure of the water tank (261) in the internal space does not increase excessively, and water is stored in the water tank (261).

When water has been sufficiently stored in the humidifying unit (260), a humidifying operation is performed. During the humidifying operation, the switching valve (224) is switched so that the internal path (222) communicates with the air-supply path (263) of the humidifying unit (260). At this time, a part or all of air that has passed through the water extracting unit (250) flows to the air-supply path (263) in accordance with the humidity of the internal space (201). As air is supplied to the water tank (261) through the air-supply path (263), the pressure in the water tank (261) increases, and air including water is supplied from the humidifying nozzle (264) to the internal space. Thus, the internal space is humidified when the humidifying operation is performed.

Advantageous Effects of First Embodiment

In the first embodiment, external air (water-extraction air) that flows through the air path (220) is cooled by the cooling unit (240), and then water is extracted by the water extracting unit (250) and stored in the humidifying unit (260).

With existing technology, a humidifier (210) cools air in a path that supplies the air to the internal space, stores water that is generated by cooling the air in a tank, and humidifies the internal space by using the water. With this humidifier, for example, it is difficult to recover water when the humidity of the outside of the target space is low, and water is not easily stored in a water tank (261) in the internal space when air is constantly supplied to the water tank and thus the pressure of the water tank becomes high. As a result, the humidifier (210) according to the existing technology may not be able to sufficiently humidify the internal space.

With the first embodiment, when storing water in the water tank (261), air that flows through the air path (220) is discharged to the external space. Therefore, increase of the pressure of the water tank (261) in the internal space (201) is suppressed, and a sufficient amount of water can be stored in the water tank (261). By subsequently switching airflow in the air path (220) toward the humidifying unit (260), the internal space can be humidified by using water stored in the water tank (261). As described above, with the present embodiment, the main path and the discharge path (223) are provided in the air path (220) so that an operation of storing water and an operation of humidifying the internal space can be performed, and thus it is possible to sufficiently humidify the target space without receiving supply of water.

Figure 8:
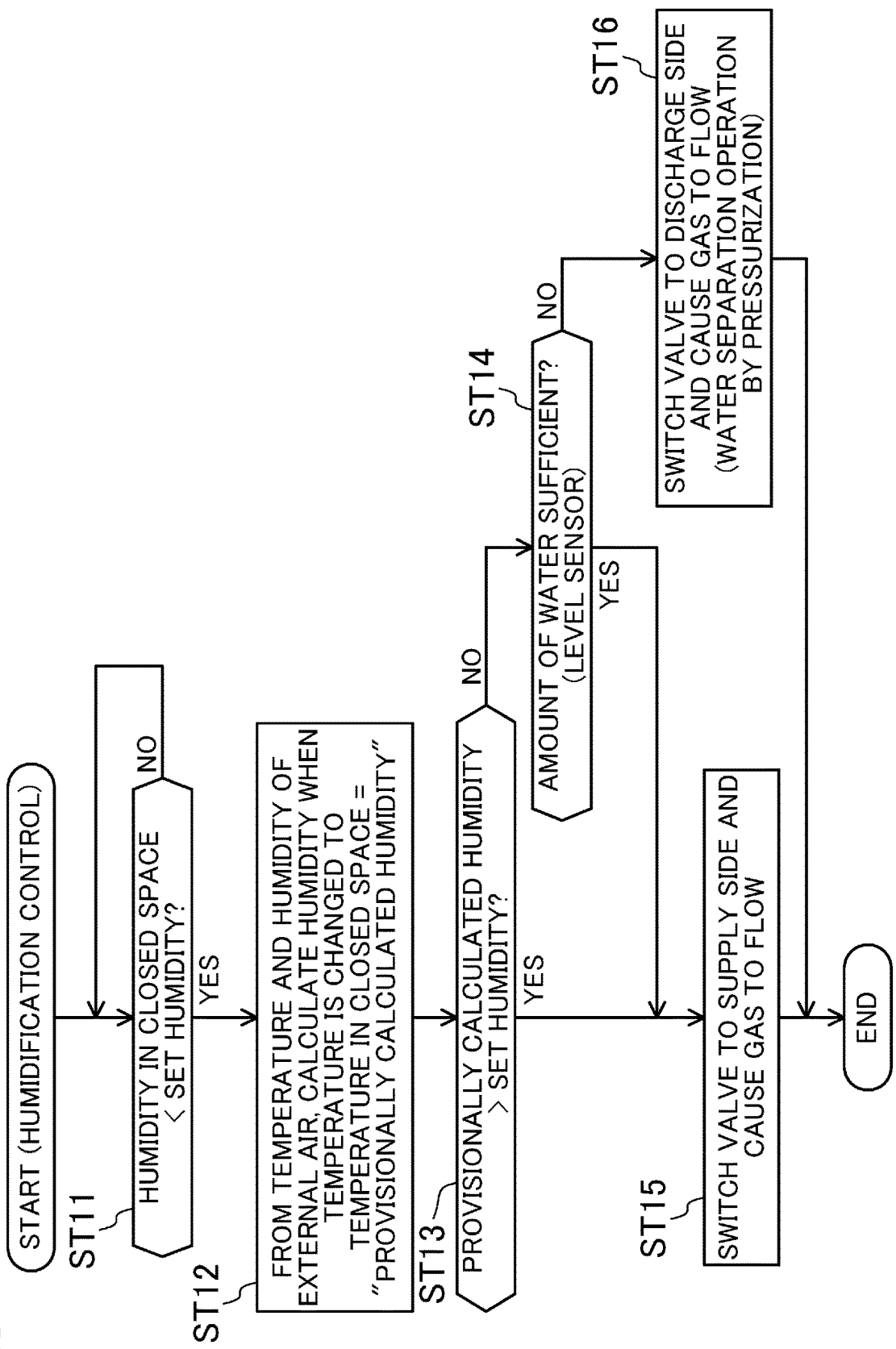
FIG. 8 is a flowchart of a first control example according to the first embodiment.
Figure 9:
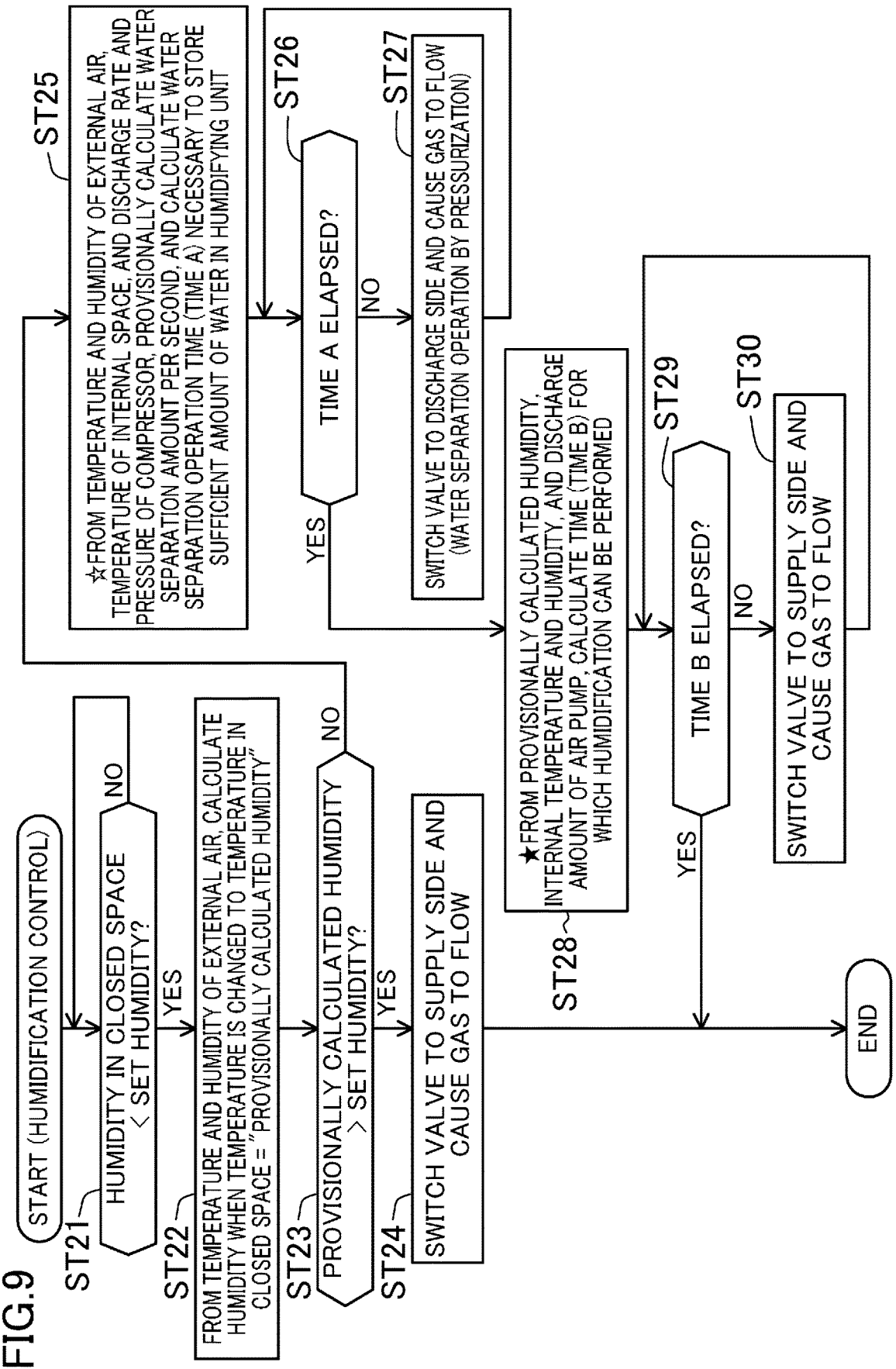
FIG. 9 is a flowchart of a second control example according to the first embodiment.

Specific examples of control of the humidifier (210) will be described below with reference to the flowcharts of FIGS. 8 and 9.

Modifications of First Embodiment

First Modification

Figure 2:
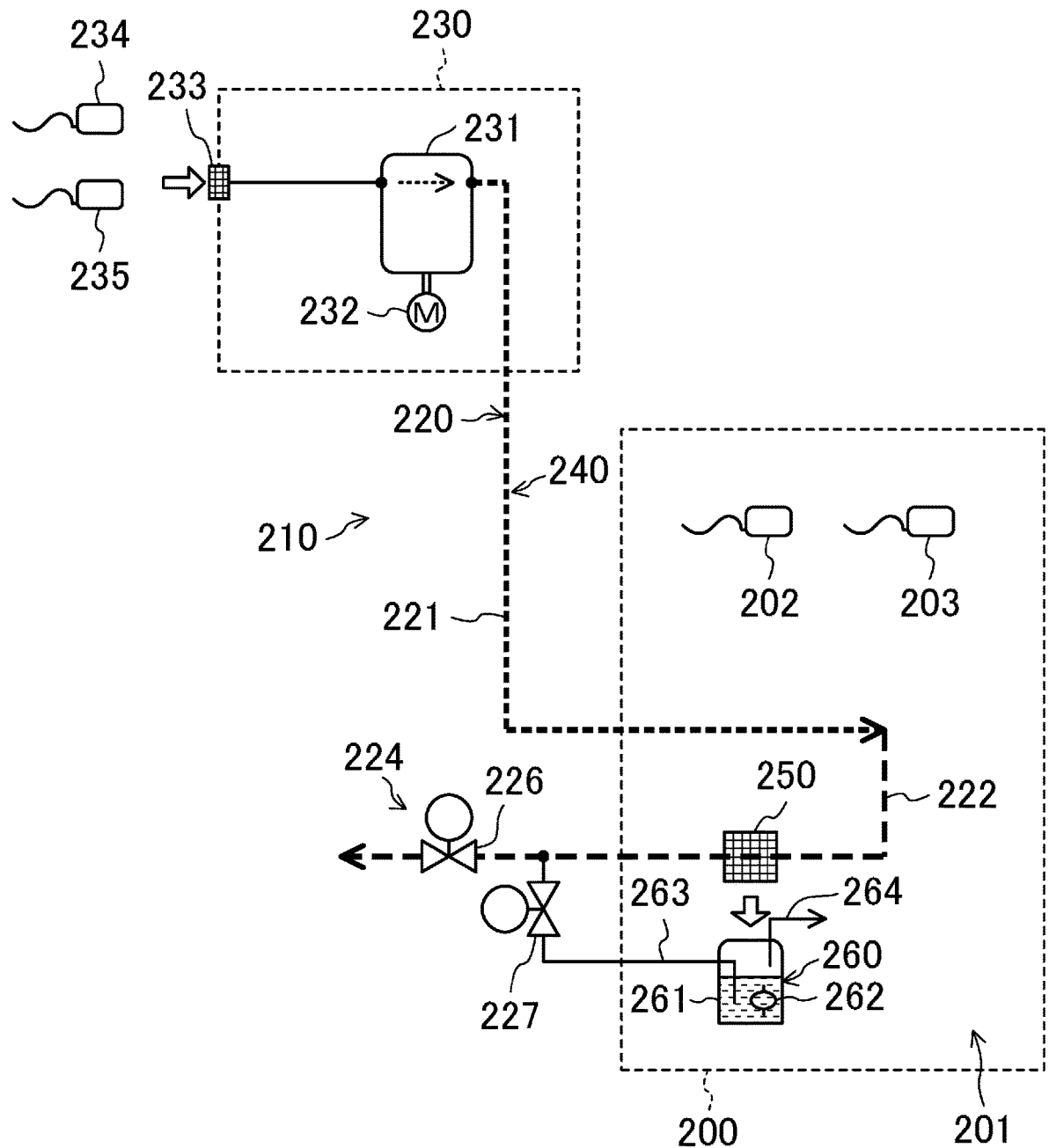
FIG. 2 is a schematic diagram of a humidifier according to a first modification of the first embodiment.

FIG. 2 illustrates a first modification of the first embodiment, which differs from the first embodiment shown in FIG. 1 in the configuration of the switching valve (224).

In the first modification, instead of using one three-way valve (225) as the switching valve (224), two electromagnetic valve (a first electromagnetic valve (226) and a second electromagnetic valve (227)) are used as the switching valve (224). The first electromagnetic valve (226) is provided in the discharge path (223). The air-supply path (263) is connected to the air-discharge path at a position between the water extracting unit (250) and the first electromagnetic valve (226). The second electromagnetic valve (227) is provided in the air-supply path (263).

The configuration of the humidifier (210) according to the first modification is the same as that of the first embodiment, except for the configuration of the switching valve (224).

In the first modification, an operation of storing water in the water tank (261) of the humidifying unit (260) is performed by opening the first electromagnetic valve (226) and closing the second electromagnetic valve (227). In this state, as in the first embodiment, external air that has passed through the water extracting unit (250) is not supplied to the internal space (201), and water is stored in the water tank (261). On the other hand, an operation of humidifying the internal space (201) is performed by closing the first electromagnetic valve (226) and opening the second electromagnetic valve (227). In this state, external air that has passed through the water extracting unit (250) is supplied to the water tank (261). Thus, water stored in the water tank (261) is ejected from the humidifying nozzle (264) into the internal space (201), and the internal space (201) is humidified.

Also in the first modification, as in the first embodiment, when storing water in the water tank (261), air that flows through the air path (220) is discharged to the external space. Therefore, increase of the pressure of the internal space (201) is suppressed, and a sufficient amount of water can be stored in the water tank (261). By subsequently switching the airflow in the air path (220) toward the humidifying unit (260), the internal space can be humidified by using water stored in the water tank (261). As described above, also with the present modification, the main path and the discharge path (223) are provided in the air path (220) so that an operation of storing water and an operation of humidifying the internal space can be performed, and thus it is possible to sufficiently humidify the target space without receiving supply of water.

A flow control valve, instead of an on-off valve, may be used as each of the first electromagnetic valve (226) and the second electromagnetic valve (227).

Second Modification

Figure 3:
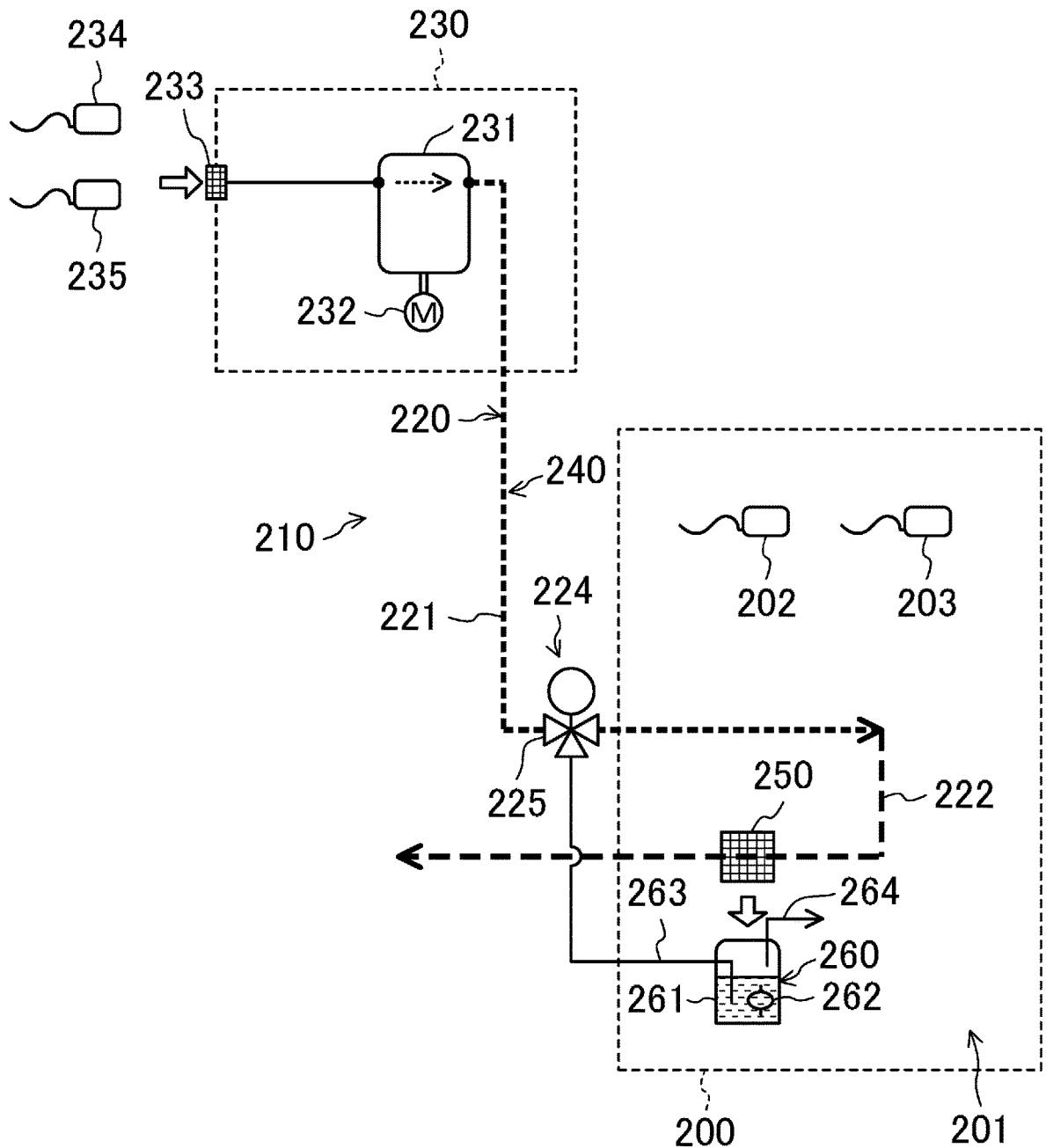
FIG. 3 is a schematic diagram of a humidifier according to a second modification of the first embodiment.

FIG. 3 illustrates a second modification of the first embodiment, which differs from the first embodiment shown in FIG. 1 in the disposition of the switching valve (224).

In the second modification, as in the first embodiment, one three-way valve (225) is used as the switching valve (224). The three-way valve (225) is provided in the external path (221). A first port and a second port of the three-way valve (225) are connected to the discharge path (223), and a third port of the three-way valve (225) is connected to the air-supply path (263).

The configuration of the humidifier (210) according to the second modification is the same as that of the first embodiment, except for the disposition of the switching valve (224).

In the second modification, an operation of storing water in the water tank (261) of the humidifying unit (260) is performed by opening the external path (221) side of the three-way valve (225) and closing the air-supply path (263).

In this state, external air is not supplied to the water tank (261), and thus water is stored in the water tank (261). On the other hand, when an operation of humidifying the internal space (201) is performed, the external path (221) side of the three-way valve (225) is closed, and the air-supply path (263) side is opened. In this state, external air is supplied to the water tank (261). Thus, water stored in the water tank (261) is supplied from the humidifying nozzle (264) into the internal space (201) as air including water, and the internal space (201) is humidified.

Also in the second modification, as in the first embodiment and the first modification, when storing water in the water tank (261), air that flows through the air path (220) is discharged to the external space. Therefore, increase of the pressure of the internal space (201) (the water tank (261)) is suppressed, and a sufficient amount of water can be stored in the water tank (261). By subsequently switching the airflow in the air path (220) toward the humidifying unit (260), the internal space can be humidified by using water stored in the water tank (261). As described above, also with the present modification, the main path and the discharge path (223) are provided in the air path (220) so that an operation of storing water and an operation of humidifying the internal space can be performed, and thus it is possible to sufficiently humidify the target space without receiving supply of water.

Third Modification

Figure 4:
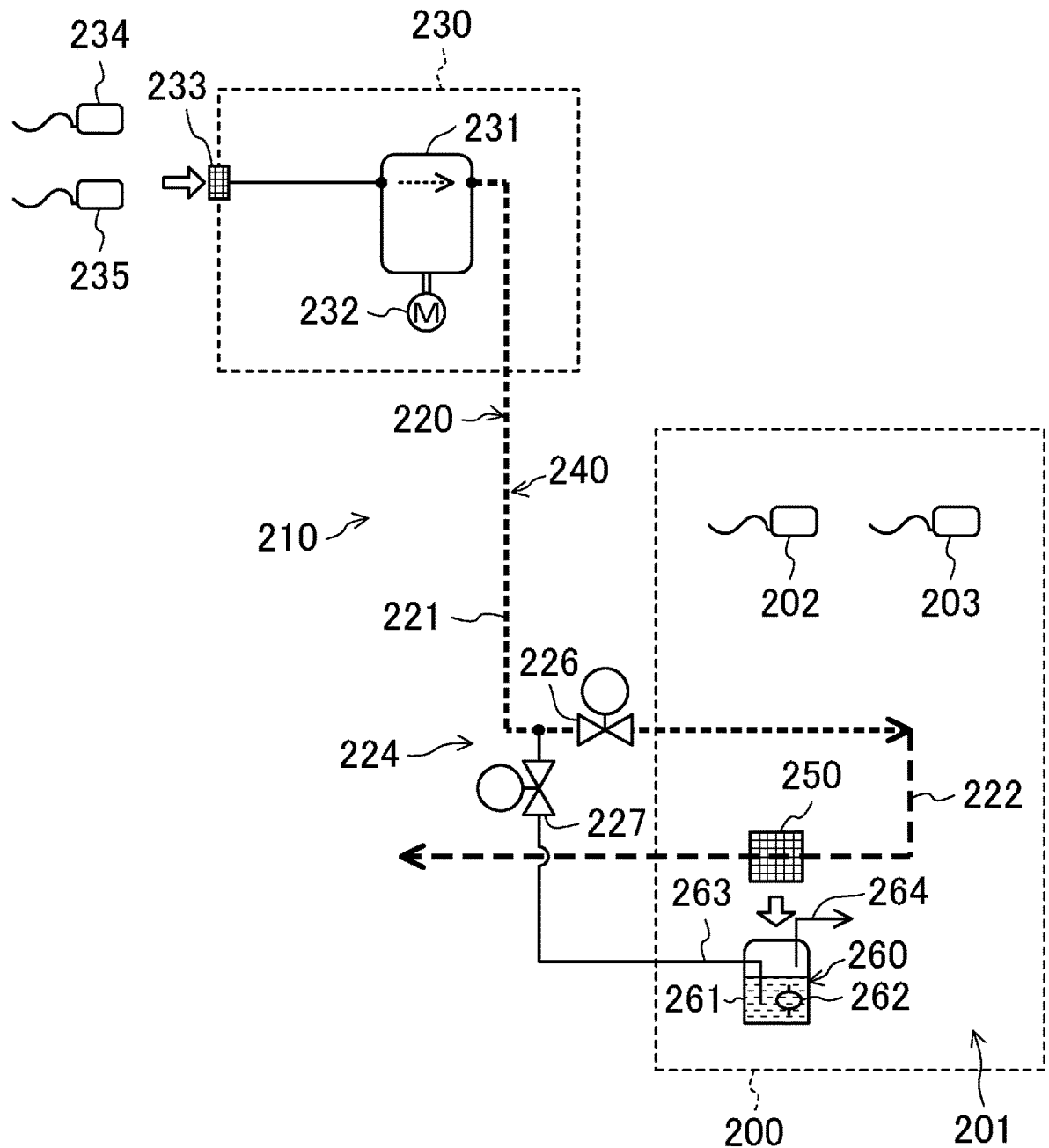
FIG. 4 is a schematic diagram of a humidifier according to a third modification of the first embodiment.

FIG. 4 illustrates a third modification of the first embodiment, which differs from the first modification shown in FIG. 2 in the disposition of the switching valve (224).

In the third modification, as in the first modification, two electromagnetic valves (the first electromagnetic valve (226) and the second electromagnetic valve (227)) are used as the switching valve (224). The first electromagnetic valve (226) is provided in the external path (221). The air-supply path (263) is connected to the external path (221) at a position between the compressing unit (230) and the first electromagnetic valve (226). The second electromagnetic valve (227) is provided in the air-supply path (263).

The configuration of the humidifier (210) according to the third modification is the same as that of the first modification, except for the disposition of the switching valve (224).

In the third modification, an operation of storing water in the water tank (261) of the humidifying unit (260) is performed by opening the first electromagnetic valve (226) and closing the second electromagnetic valve (227). In this state, external air is not supplied to the water tank (261), and thus water is stored in the water tank (261). On the other hand, when an operation of humidifying the internal space (201) is performed, the first electromagnetic valve (226) is closed and the second electromagnetic valve (227) is opened. In this state, external air is supplied to the water tank (261). Thus, water stored in the water tank (261) is supplied from the humidifying nozzle (264) into the internal space (201) as air including water, and the internal space (201) is humidified.

Also in the third modification, as in the first embodiment and the first and second modifications, when storing water in the water tank (261), air that flows through the air path (220) is discharged to the external space. Therefore, increase of the pressure of the internal space (201) (the water tank (261)) is suppressed, and a sufficient amount of water can be stored in the water tank (261). By subsequently switching the airflow in the air path (220) toward the humidifying unit (260), the internal space can be humidified by using water stored in the water tank (261). As described above, also with the present modification, the main path and the discharge path (223) are provided in the air path (220) so that an operation of storing water and an operation of humidifying the internal space can be performed, and thus it is possible to sufficiently humidify the target space without receiving supply of water.

Fourth Modification

Figure 5:
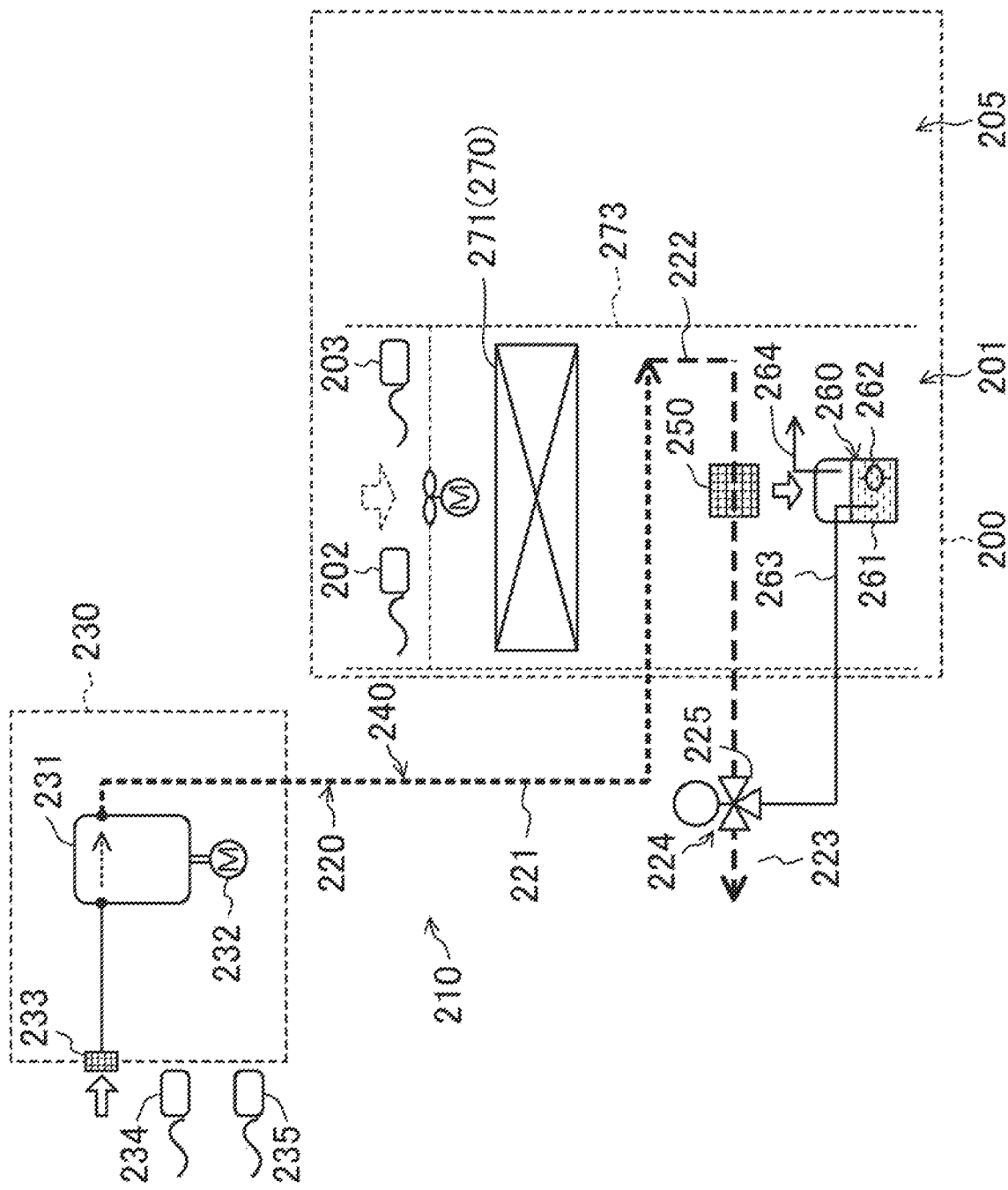
FIG. 5 is a schematic diagram of a humidifier according to a fourth modification of the first embodiment.

FIG. 5 illustrates a fourth modification, which is an example including a refrigerator that cools air in the internal space (201) of the storage chamber (200).

In the fourth modification, the storage chamber (200) has the internal space (201) and a storage space (205) that are separated by a partition plate (273). In the internal space (201), various devices are provided as in the first embodiment and the first to third modifications. In the internal space (201), an evaporator provided in a refrigerator (270) having a refrigerant circuit (the entirety of which is not shown) is disposed. The internal space (201) is a space for cooling air inside of the storage chamber (200). Cooled air circulates in the storage chamber (200) in such a way that, in the figure, the cooled air flows downward in the internal space (201), flows into the storage space (205), and flows into the internal space (201) from an upper part of the storage space.

In the present modification, external air that flows through the air path (220) is cooled in the external path (221), and is cooled in the internal space (201) by using air that has been cooled while passing through the evaporator.

In the fourth modification, other elements, such as the compressing unit (230), the water extracting unit (250), and the humidifying unit (260), are the same as those of the first embodiment.

<Operation>

In the humidifier (210), when the air pump (231) is activated, external air is sucked into the air pump (231) through the filter provided at the inlet of the air path (220). The air pump (231) pressurizes and discharges the external air. The pressurized external air flows through the external path (221). The pressurized air has a high temperature (for example, 100° C.), which is higher than the temperature of external air. Therefore, the high-temperature external air that flows through the external path (221) is cooled by air around the external path (221). When the high-temperature external air that flows through the external path (221) is cooled, water vapor in the air condenses into water, and the external air and the water flow in the external path (221).

External air and water that flow through the external path (221) flow into the internal path (222), is further cooled by low-temperature air in the internal space (201), and water is generated in the internal path (222). The water extracting unit (250) is provided in the internal path (222), and water in air is extracted and stored in the water tank (261) of the humidifying unit (260). External air that has passed through the water extracting unit (250) flows to the discharge path (223). When storing water in the humidifying unit (260) (when performing a water storing operation), the switching valve (224) is switched so that the internal path (222) and the discharge path (223) communicate with each other and the air-supply path (263) is closed. Then, a part or all of air that has passed through the water extracting unit (250) is discharged to the external space. Therefore, the pressure of the water tank (261) of the humidifying unit (260), which is provided in the internal space, does not increase excessively, and water is stored in the water tank (261).

When water has been sufficiently stored in the humidifying unit (260), a humidifying operation is performed. During the humidifying operation, the switching valve (224) is switched so that the internal path (222) communicates with the air-supply path (263) of the humidifying unit (260). At this time, a part or all of air that has passed through the water extracting unit (250) flows to the air-supply path (263) in accordance with the humidity of the internal space (201). As air is supplied to the water tank (261) through the air-supply path (263), the pressure in the water tank (261) increases, and air including water is supplied from the humidifying nozzle (264) to the internal space. Thus, the internal space is humidified when the humidifying operation is performed.

Advantageous Effects of Fourth Modification

In the fourth modification, external air (water-extraction air) that flows through the air path (220) is cooled by the cooling unit (240), and then is further cooled by internal air. Generated water is extracted by the water extracting unit (250) and stored in the humidifying unit (260). Thus, external air, which is water-extraction air, can be cooled via internal air having a low temperature, and water can be sufficiently generated. Thus, compared with the first embodiment, the internal space can be more sufficiently humidified without receiving supply of water.

The present modification also provides the other advantageous effects described in the first embodiment.

In the fourth modification, the configuration that cools air to be supplied to the water extracting unit (250) via internal air cooled by the evaporator is applied to the humidifier (210) according to the first embodiment. However, the configuration that cools air to be supplied to the water extracting unit (250) via internal air cooled by the evaporator may applied to any of the first to third modifications. Also in this case, advantageous effects similar to those of the fourth modification can be provided.

Fifth Modification

The cooling unit (240) may be a cooling heat exchanger that cools external air in the air path (220) by performing heat exchange between the external air and a refrigerant of a refrigerant circuit included in the refrigerator.

Figure 6:
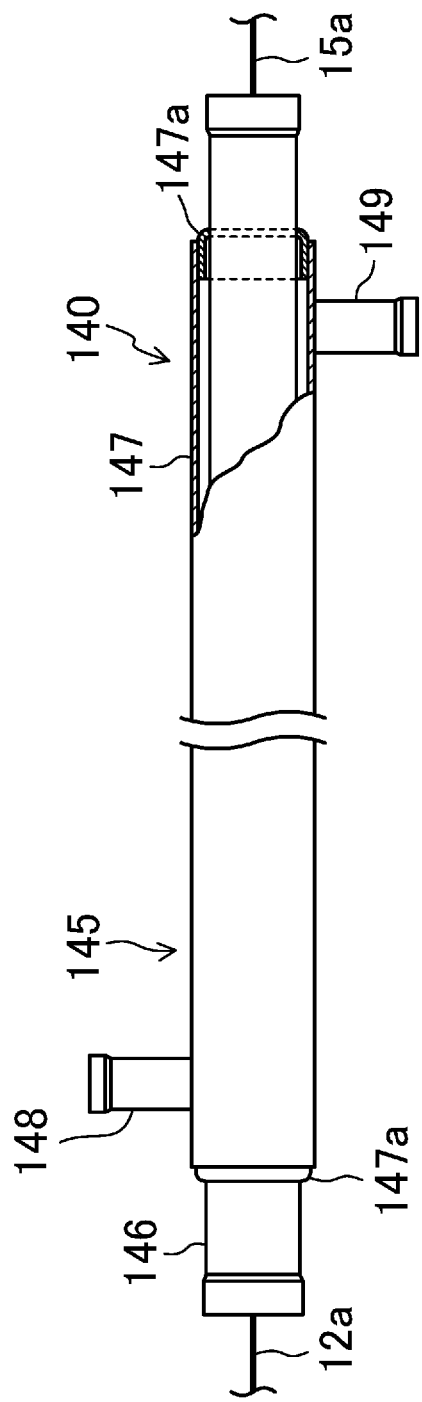
FIG. 6 is a schematic diagram of a humidifier according to a fifth modification of the first embodiment.

As illustrated in FIG. 6, in the fifth modification, the cooling unit (240) is constituted by a double-pipe heat exchanger (145). The double-pipe heat exchanger (145) includes, as described below: an inner pipe (146) that is connected between a suction pipe (12a) of a compressor of a refrigerant circuit, which will be descried in a second embodiment, and an outlet pipe (15a) of an evaporator; and an outer pipe (147) that has an inside diameter larger than the outside diameter of the inner pipe (146) and has a length smaller than that of the inner pipe (146). Both end portions of the outer pipe (147) are closed by end plates (147a).

At one end of the outer pipe (147), an air inflow pipe (148), which is connected to the air path (220), is provided. At the other end of the outer pipe (147), an air outflow pipe (149), which is connected to the water extracting unit (250), is provided.

With this configuration, air-to-be-treated that has flowed from the air inflow pipe (148) into the outer pipe (147) is cooled by a low-temperature refrigerant that flows in the inner pipe, and a part of water vapor included in the air-to-be-treated condenses. The air-to-be-treated, in which a part of water has condensed, flows to the water extracting unit (250), where the condensation water is supplied to the humidifying unit (260). As air is supplied from the supply pipe (263) to the water tank (261), the condensation water supplied to the humidifying unit (260) is supplied to the internal space (201) from the humidifying nozzle (264) as air including water.

Accordingly, also with the fifth modification, it is possible to humidify and to maintain the humidity of the internal space (201), as with each of the first embodiment and the modifications.

Sixth Modification

Figure 7:
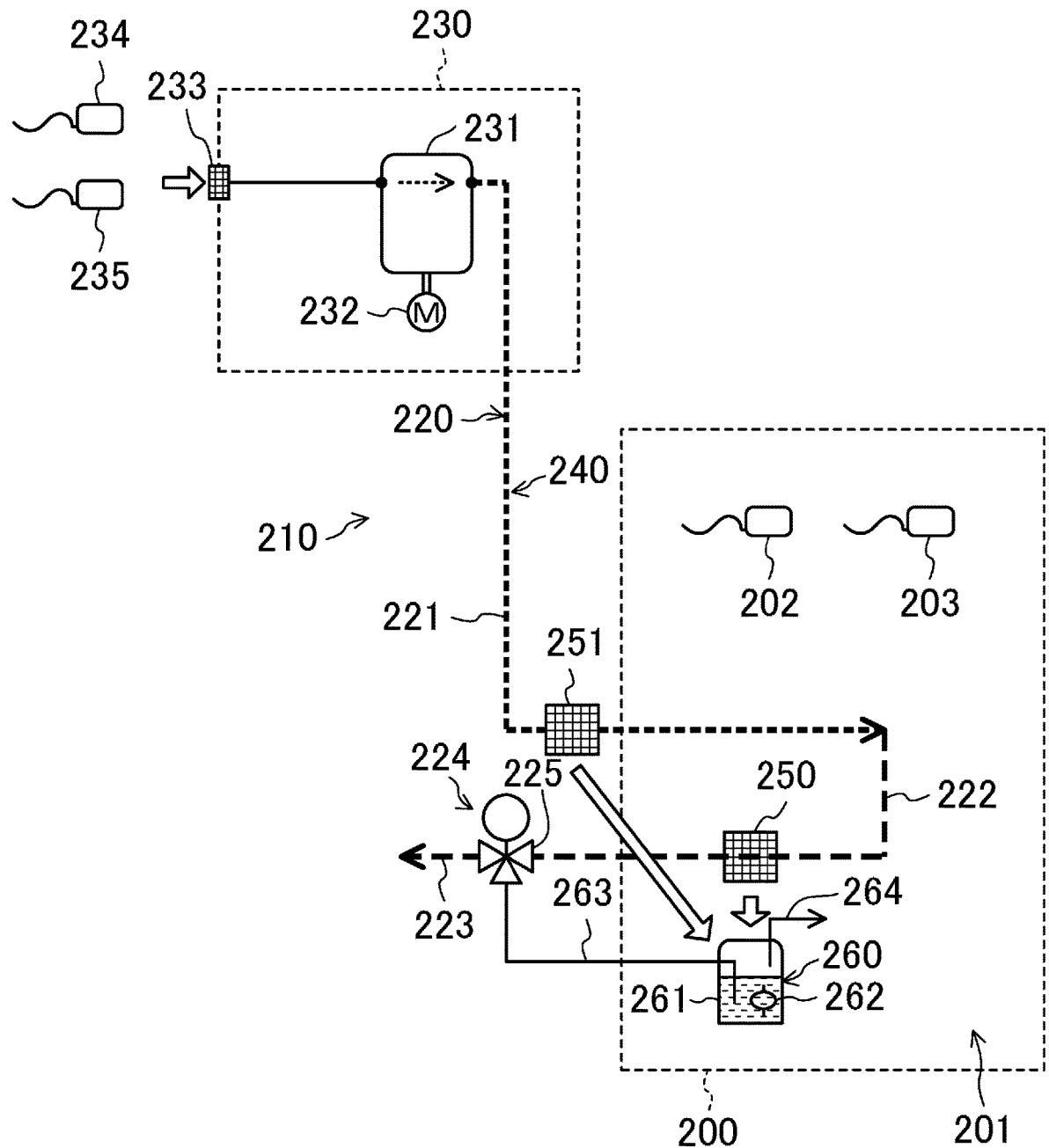
FIG. 7 is a schematic diagram of a humidifier according to a sixth modification of the first embodiment.

FIG. 7 illustrates a sixth modification, which differs from the first embodiment in that two water extracting units (250) are provided, in contrast to the first embodiment in which one water extracting unit (250) is provided in the humidifier (210).

To be specific, the water extracting unit (250) of the first embodiment is provided in the internal path (222) as a first water extracting unit (250), and is located in the internal space (201). The other water extracting unit (250) is provided in the external path (221) as a second water extracting unit (251), and is located in the external space. Thus, in the sixth modification, the water extracting units (250) are respectively provided inside and outside of the internal space (201).

In the sixth modification, water that is generated from air cooled in the external space is extracted by the second water extracting unit (251) in the external space. Water that is cooled and generated inside of the internal space (201) is extracted by the first water extracting unit (250). Depending on the conditions of external air and the like, the amount of water extracted outside of the target space (201) may be larger than the amount of water extracted inside of the target space (201). With the sixth modification, the target space (201) can be sufficiently humidified in such a case.

For example, if the temperature of external air is lower than the temperature of the internal space (201), there may be a case where the amount of condensation water obtained from external air pressurized by the air pump (231) is larger than the amount of condensation water obtained by subsequently further cooling the air in the internal space (201). In such a case, with the sixth modification, the second water extracting unit (251) can be effectively used to humidify the internal space (201).

<First Humidification Control>

Referring to the flowchart of FIG. 8, a first control example according to the embodiment will be described. The first humidification control is a control example in a case where the level sensor (262) is provided in the water tank (261) of the humidifying unit (260) as shown in FIG. 1. A control example in a case where the level sensor (262) is not provided will be described below in a second humidification control.

In the first humidification control, when the internal space (201) is not humidified by using the humidifying unit (260), humidification is performed by introducing external air into the internal space. On the other hand, when it is not possible to perform humidification by using external air, the amount of water in the humidifying unit (260) is detected by using the level sensor (262), and a water storing operation and a humidifying operation are switched. When the humidity of the internal space (201) is lower than a predetermined value, the switching valve (224) is switched so that airflow in the air path (220) is directed toward the main path (221, 222, 263). When the humidity of the internal space (201) is higher than or equal to the predetermined value, the switching valve (224) is switched so that airflow in the air path (220) is directed toward the discharge path (223). For the first humidification control, detection values of the external air humidity sensor (234), the external air temperature sensor (235), the internal humidity sensor (202), and the internal temperature sensor (203) are used.

When the first humidification control is started, in step ST11, whether the humidity of the internal space (201) (represented as "closed space" in the flowchart) is lower than a set humidity is determined. Unless it is determined that the humidity of the internal space (201) is lower than the set humidity, the process does not proceed to the next step. If it is determined that the humidity of the internal space (201) is lower than the set humidity, the process proceeds to step ST12.

In step ST12, from the temperature and the humidity of external air, the humidity of external air in a case where the temperature of external air is changed to the temperature of the internal space (201) is calculated, and this humidity is defined as a "provisionally calculated humidity". Next, the process proceeds to step ST13, and whether the provisionally calculated humidity is higher than the set humidity is determined. If the provisionally calculated humidity is higher than the set humidity, the humidity of external air when the external air is cooled to the internal temperature is higher than the humidity of the internal space.

If the determination result is "YES", in step ST15, in the air path (220), the switching valve (224) is switched so that air that has passed through the water extracting unit (250) flows to the humidifying unit (260) through an air-suction path. By doing so, the internal space is humidified by using high-humidity external air. If a sufficient amount of water has been stored in the water tank (261), the water is supplied from the humidifying nozzle (264) to the internal space as water included in air, and the internal space (201) is humidified.

If the determination result in step ST13 is "NO", the process proceeds to step ST14, and whether the amount of water in the water tank (261) is sufficient is determined based on the detection value of the level sensor (262). If the amount of water is sufficient, the process proceeds to step ST15. At this time, since a sufficient amount of water has been stored in the water tank (261) as described above, the water is supplied from the humidifying nozzle (264) to the internal space as water included in air, and the internal space (201) is humidified.

If it is determined in step ST14 that the amount of water in the water tank (261) is not sufficient, the process proceeds to step ST16. In step ST16, the switching valve (224) is switched so that air that has passed through the water extracting unit (250) flows to the discharge path (223). At this time, air that has passed through the water extracting unit (250) is not supplied to the internal space (the humidifying unit (260)). Thus, the pressure of the humidifying unit (260) does not increase. Therefore, water extracted from the air path (220) by the water extracting unit (250) is stored in the humidifying unit (260). When a sufficient amount of water is stored in the humidifying unit (260), the determination result is step ST14 becomes "YES", and the internal space (201) is humidified.

<Second Humidification Control>

Referring to the flowchart of FIG. 9, second humidification control, which is a control example in a case where the level sensor (262) is not provided in the humidifying unit (260), will be described. In the second humidification control, in which the level sensor (262) is not provided, a time (time A) that is necessary to extract water from water-extraction air in the air path (220) is calculated. Moreover, a humidification enabled time (time B) until water stored in the water tank (261) is depleted is calculated, and a time for which air in the air path (220) is caused to flow to the humidifying unit (260) is determined.

When the second humidification control is started, in step ST21, whether the humidity of the internal space (201) (represented as "closed space" in the flowchart) is lower than a set humidity is determined. Unless it is determined that the humidity of the internal space (201) is lower than the set humidity, the process does not proceed to the next step. If it is determined that the humidity of the internal space (201) is lower than the set humidity, the process proceeds to step ST22.

In step ST22, from the temperature and the humidity of external air, the humidity of external air in a case where the temperature of external air is changed to the temperature of the internal space (201) is calculated, and this humidity is defined as a "provisionally calculated humidity". Next, the process proceeds to step ST23, and whether the provisionally calculated humidity is higher than the set humidity is determined. If the provisionally calculated humidity is higher than the set humidity, the humidity of external air when the external air is cooled to the internal temperature is higher than the humidity of the internal space.

If the determination result is "YES", in step ST24, in the air path (220), the switching valve (224) is switched so that air that has passed through the water extracting unit (250) flows to the humidifying unit (260) through an air-suction path. By doing so, the internal space is humidified by using high-humidity external air. If a sufficient amount of water has been stored in the water tank (261), the water is supplied from the humidifying nozzle (264) to the internal space as water included in air, and the internal space (201) is humidified.

If the determination result in step ST23 is "NO", the process proceeds to step ST25, and the water separation amount per second is calculated from the temperature and the humidity of external air, the temperature of the internal space, and the discharge rate and the pressure of air discharged from the air pump (231). Then, a water separation operation time (time A), which is a time that is necessary to store a sufficient amount of water in the humidifying unit (260), is calculated.

Next, in step ST26, whether the time A has elapsed is determined. In the determination result is "NO", the switching valve (224) is switched so that air that has passed through the water extracting unit (250) flows to the discharge path (223), an operation of extracting water from air in the air path (220) is performed, and the loop of step ST26 and step ST27 is repeated.

In the determination result in step ST26 is "YES", it is determined that a sufficient amount of water is stored in the humidifying unit (260). At this time, the process proceeds to step ST28, and a humidifying operation time (time B), for which humidification can be performed, is calculated from the provisionally calculated humidity, the internal temperature and the internal humidity, and the discharge rate of the air pump (231).

In step ST29 and step ST30, until the time B elapses, air that has passed through the water extracting unit (250) flows into the water tank (261) of the humidifying unit (260). Thus, the pressure of the water tank (261) increases, water in the water tank (261) is supplied from the humidifying nozzle (264) to the internal space as water included in air, and the internal space (201) is humidified.

When the time B has elapsed in step ST29, it is determined that the humidifying operation time has elapsed, and the humidifying operation is finished.

As described above, in either of the first humidification control and the second humidification control, an operation of discharging water-extraction air that flows through the air path (220) to the external space and an operation of supplying the water-extraction air to the internal space are performed, and thus the internal space (201) can be sufficiently humidified without receiving supply of water.

Second Embodiment

An air composition adjustment device according to the present embodiment is an internal air adjustment device (30) that is provided in a transport container (1) in order to perform so-called controlled atmosphere (CA) transportation. The internal air adjustment device (30) adjusts the composition of air in the internal space (target space) of the transport container (1) to become different from that of the atmosphere. The internal air adjustment device (30) includes a humidifier according to the present disclosure.

Figure 10:
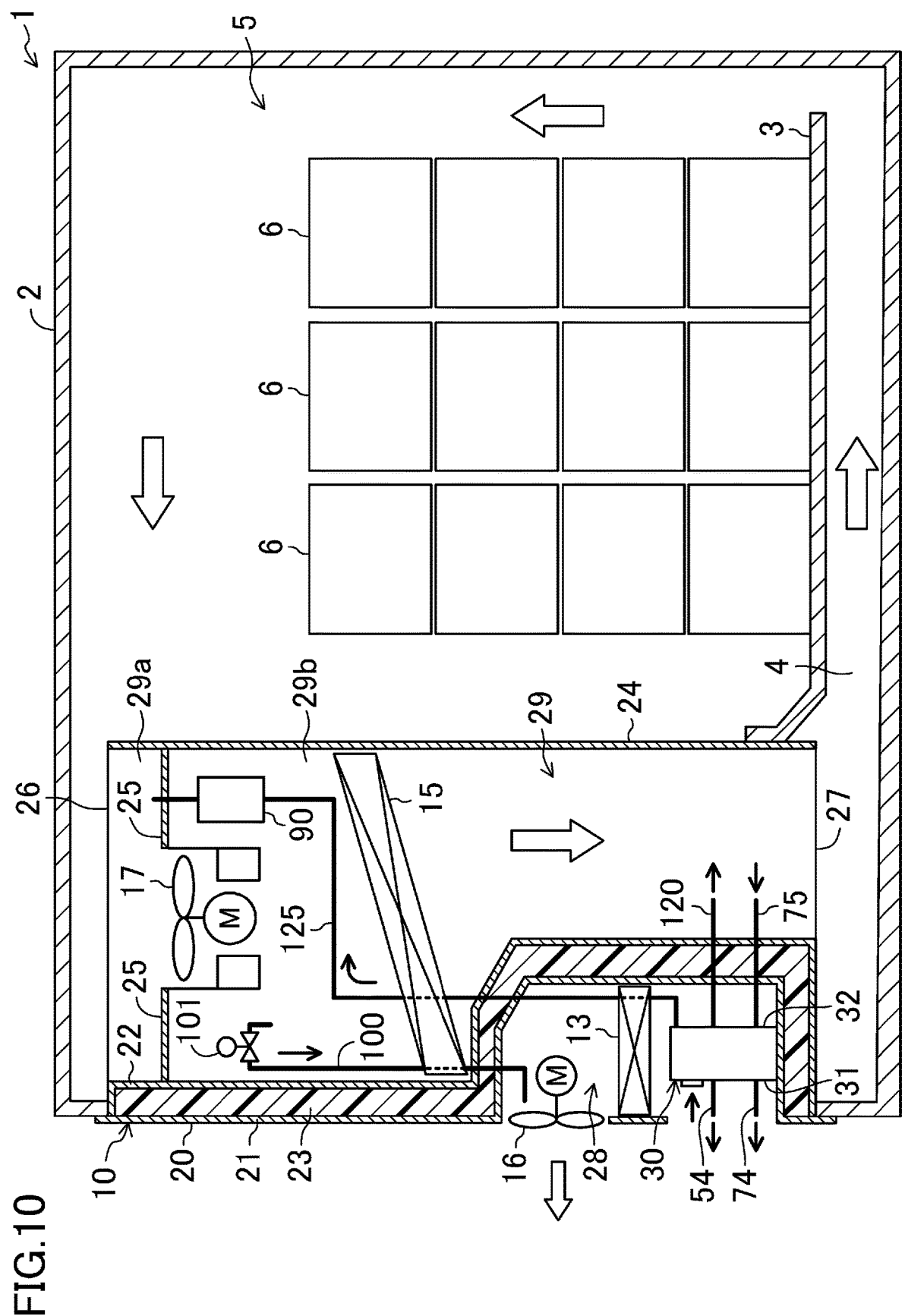
FIG. 10 is a schematic sectional view of a transport container including an internal air adjustment device according to a second embodiment.
Figure 11:
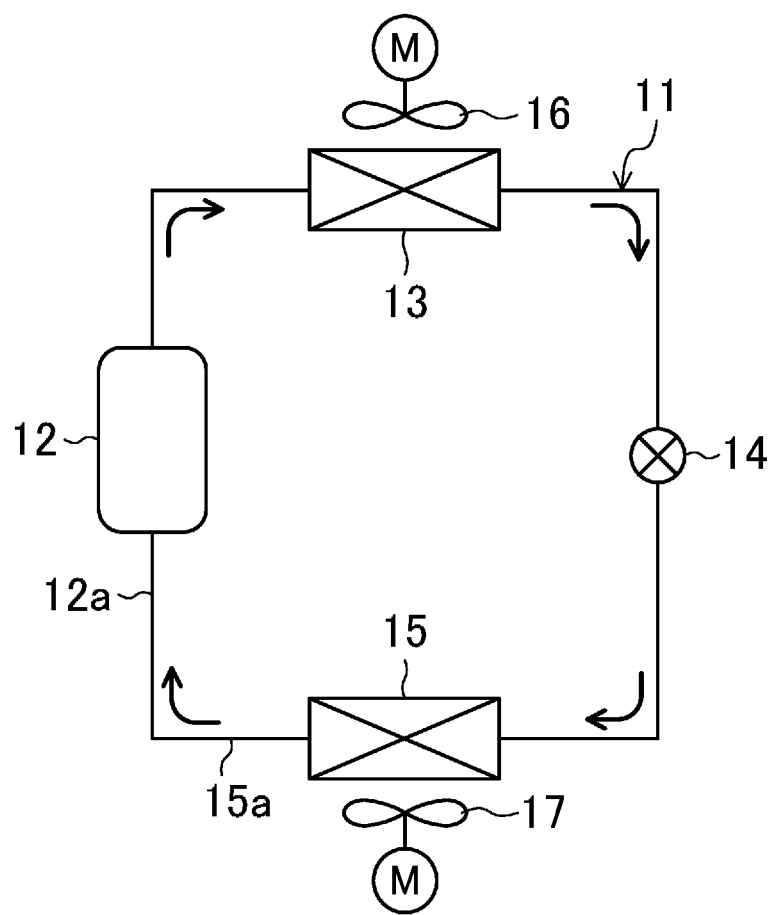
FIG. 11 is a refrigerant circuit diagram of a container refrigerator provided in the transport container.

As illustrated in FIG. 10, the transport container (1), which forms the storage chamber, includes a container body (2) and a container refrigerator (10). The transport container (1) is a reefer container that is capable of controlling the temperature of the internal space. The internal air adjustment device (30) according to the present embodiment is installed in the container refrigerator (10). The transport container (1) is used to transport plants such as agricultural products that perform respiration by taking in oxygen ($O_2$) and discharging carbon dioxide ($CO_2$). Examples of plants include fruits such as bananas and avocados, vegetables, grains, bulbs, flowers, and the like.

The container body (2) has an elongated rectangular-parallelepiped-box shape. One end surface of the container body (2) is open, and the container refrigerator (10) is attached so as to close the open end. The internal space of the container body (2) serves as a freight chamber (5) for storing freight (6).

A floor board (3) for loading the freight (6) thereon is disposed in a bottom portion of the freight chamber (5). An underfloor passage (4), for allowing air blown out by the container refrigerator (10) to flow therethrough, is formed between the floor board (3) and a bottom plate of the container body (2). The underfloor passage (4) extends in the longitudinal direction of the container body (2) along the bottom plate of the container body (2). One end of the underfloor passage (4) is connected to a blow-out opening (27) of the container refrigerator (10), and the other end of the underfloor passage (4) communicates with a space above the floor board (3) (that is, a space in which the freight (6) is contained).

—Container Refrigerator—

As illustrated in FIG. 10, the container refrigerator (10) includes a casing (20), a refrigerant circuit (11) that performs a refrigeration cycle, an external fan (16), and an internal fan (17).

The casing (20) includes an external wall (21), an internal wall (22), a back plate (24), and a partition plate (25). As described below, the refrigerant circuit (11), the external fan (16), and the internal fan (17) are provided in the casing (20).

The external wall (21) is a plate-shaped member that is disposed so as to cover the open end of the container body (2). A lower part of the external wall (21) bulges inward into the container body (2). The internal wall (22) is a plate-shaped member that extends along the external wall (21). The internal wall (22) is disposed so as to cover the inner surface of the external wall (21) of the container body (2).

The space between the external wall (21) and the internal wall (22) is filled with a heat insulator (23).

A lower part of the casing (20) has a shape that is recessed inward into the container body (2). The lower part of the casing (20) forms an external machine chamber (28) that communicates with the external space of the transport container (1). The external fan (16) is disposed in the external machine chamber (28).

The back plate (24) is a substantially rectangular flat-plate-shaped member. The back plate (24) is disposed further inward in the container body (2) than the internal wall (22), and forms an internal air passage (29) between the back plate (24) and the internal wall (22). The upper end of the internal air passage (29) serves as a suction opening (26) of the casing (20), and the lower end of the internal air passage (29) serves as the blow-out opening (27) of the casing (20).

The partition plate (25) is a plate-shaped member that is disposed so as to partition the internal air passage (29) into an upper part and a lower part. The partition plate (25) is disposed in an upper region of the internal air passage (29). The partition plate (25) partitions the internal air passage (29) into a primary passage (29a) above the partition plate (25) and a secondary passage (29b) below the partition plate (25). The primary passage (29a) communicates with the freight chamber (5) via the suction opening (26). The secondary passage (29b) communicates with the underfloor passage (4) via the blow-out opening (27). The internal fan (17) is attached to the partition plate (25). The internal fan (17) is disposed so as to blow out internal air, which is sucked from the primary passage (29a), to the secondary passage (29b).

As illustrated in FIG. 2, the refrigerant circuit (11) is a closed circuit that is formed by connecting a compressor (12), a condenser (13), an expansion valve (14), and an evaporator (15) with pipes. When the compressor (12) is activated, a refrigerant circulates in the refrigerant circuit (11), and a vapor compression refrigeration cycle is performed. As illustrated in FIG. 10, the condenser (13) is disposed in the external machine chamber (28) on the suction side of the external fan (16), and the evaporator (15) is disposed in the secondary passage (29b) of the internal air passage (29). Although illustration is omitted in FIG. 10, the compressor (12) is disposed in the external machine chamber (28).

—Internal Air Adjustment Device—

Figure 12:
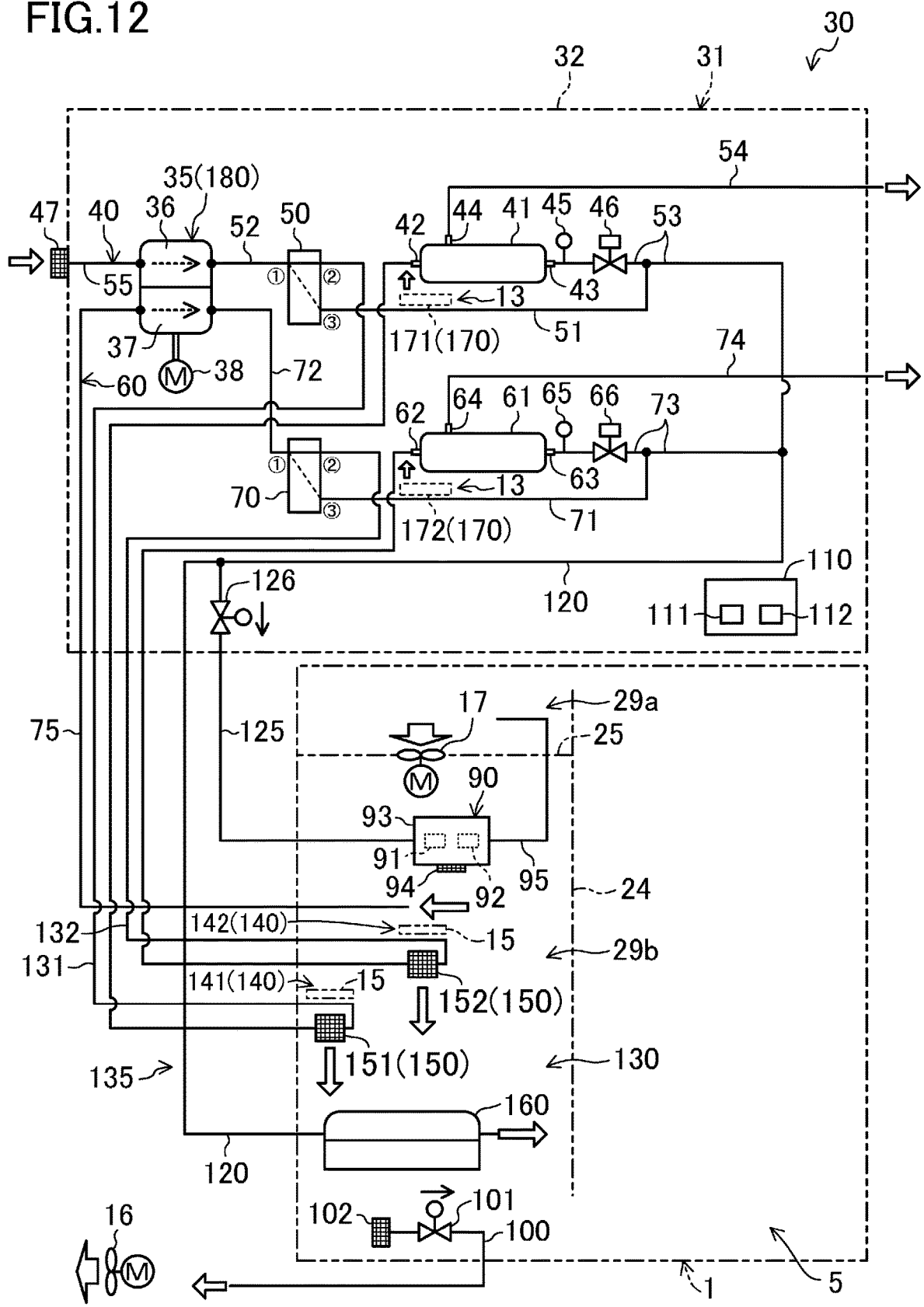
FIG. 12 is a piping diagram of the internal air adjustment device according to the second embodiment.

As illustrated in FIGS. 10 and 12, the internal air adjustment device (30) includes a main unit (31), a sensor unit (90), a ventilation discharge pipe (100), and a controller (110). The main unit (31) is installed in the external machine chamber (28) of the container refrigerator (10). The sensor unit (90) is installed in the internal air passage (29) of the transport container (1). The ventilation discharge pipe (100) is installed in both of the internal air passage (29) and the external machine chamber (28) of the transport container (1). The controller (110) is provided in the main unit (31) and controls the constituent equipment of the internal air adjustment device (30).

As illustrated in FIG. 12, the main unit (31) of the internal air adjustment device (30) includes a first composition adjuster (40), a second composition adjuster (60), a pump unit (35), and a unit case (32). The unit case (32) is a box-shaped hermetically closed vessel. The first composition adjuster (40), the second composition adjuster (60), and the pump unit (35) are disposed in the internal space of the unit case (32). Details of the first composition adjuster (40), the second composition adjuster (60), and the pump unit (35) will be described below. Each of the composition adjusters (40, 60) includes a separating unit (41, 61) that separates supply air (for example, first external air described below), which has a composition that differs from that of air-to-be-treated (external air, internal air), from the air-to-be-treated; and is configured to be capable of supplying the supply air to the internal space of the transport container (1).

The internal air adjustment device (30) includes a supply pipe (120), an internal-side suction pipe (75), and a measurement pipe (125). The supply pipe (120), the internal-side suction pipe (75), and the measurement pipe (125) are pipes for connecting the main unit (31) to the internal air passage (29) of the container refrigerator (10).

The supply pipe (120) is a pipe for supplying, to the freight chamber (5), supply air flowed out from the first composition adjuster (40) and the second composition adjuster (60). The inlet end of the supply pipe (120) is connected to the first composition adjuster (40) and the second composition adjuster (60), and the outlet end of the supply pipe (120) opens in the secondary passage (29b) of the internal air passage (29).

The internal-side suction pipe (75) is a pipe for supplying internal air in the freight chamber (5) to the second composition adjuster (60). The inlet end of the internal-side suction pipe (75) opens in the secondary passage (29b) of the internal air passage (29), and the outlet end of the internal-side suction pipe (75) is connected to a second pump (37) of the second composition adjuster (60) described below. In the secondary passage (29b) of the internal air passage (29), the inlet end of the internal-side suction pipe (75) is disposed on the upstream side of the outlet end of the supply pipe (120).

The measurement pipe (125) is a pipe for supplying, to the sensor unit (90), supply air that flows in the supply pipe (120). The inlet end of the measurement pipe (125) is connected the supply pipe (120), and the outlet end of the measurement pipe (125) is connected to the sensor unit (90). A measurement on-off valve (126), which is an electromagnetic valve, is provided in the measurement pipe (125). The measurement on-off valve (126) is contained in the unit case (32) of the main unit (31).

The ventilation discharge pipe (100), the supply pipe (120), the internal-side suction pipe (75), the measurement pipe (125), and pipes (52 to 55, 71 to 74, 95) provided in the composition adjusters (40, 60), described below, each may be a rigid pipe, a flexible hose, or a combination of a pipe and a hose.

<Pump Unit>

As illustrated in FIG. 12, the pump unit (35) includes a first pump (36), the second pump (37), and a driving motor (38).

The first pump (36) and the second pump (37) are each an air pump that sucks air (air-to-be-treated) and discharges the air. The first pump (36) and the second pump (37) are each, for example, a positive-displacement fluid machine. The first pump (36) and the second pump (37) are integrated. The driving motor (38) is an electric motor coupled to the first pump (36) and the second pump (37). The driving motor (38) drives both of the first pump (36) and the second pump (37).

<First Composition Adjuster>

The first composition adjuster (40) is configured to separate external air (untreated external air) sucked from the outside of the transport container (1), which is first air-to-be-treated, into first external air and second external air. The first composition adjuster (40) according to the present embodiment supplies the first external air, which is supply air, to the freight chamber (5), and discharges the second external air, which is discharge air, to the outside of the transport container (1).

The first composition adjuster (40) includes an air filter (47), a first separation module (first separating unit) (41), a first bypass valve (50), a first pressure sensor (45), and a first control valve (46). The first composition adjuster (40) includes an external-side suction pipe (55), a first inlet pipe (52), a first primary-side pipe (53), a first secondary-side pipe (54), and a first bypass pipe (51). The first pump (36) of the pump unit (35) constitutes the first composition adjuster (40).

Between the first bypass valve (50) and the first separation module (41), a first cooling pipe (131), which passes through the secondary passage (29b) of the internal air passage (29), is connected. The first cooling pipe (131) and structures related thereto will be described below.

The air filter (47) is a membrane filter for trapping dust and salt included in external air. The air filter (47) is attached to the unit case (32) of the main unit (31). The air filter (47) is connected to the suction opening of the first pump (36) via the external-side suction pipe (55). In the internal air adjustment device (30) according to the present embodiment, the external-side suction pipe (55) may be omitted, and the air filter (47) and the first pump (36) may communicate with each other via the internal space of the unit case (32), which is a hermetically closed vessel.

As will be described below in detail, the first separation module (41) includes a first inlet (42), a first primary-side outlet (43), and a first secondary-side outlet (44). The first inlet (42) is connected to the discharge opening of the first pump (36) via the first cooling pipe (131) and first inlet pipe (52). The first primary-side outlet (43) is connected to the supply pipe (120) via the first primary-side pipe (53). One end of the first secondary-side pipe (54) is connected to the first secondary-side outlet (44). The first secondary-side pipe (54) extends to the outside of the unit case (32). The other end of the first secondary-side pipe (54) opens in the external machine chamber (28) on the suction side of the external fan (16).

The first bypass valve (50) is a switching valve having three ports and constitutes a first bypass valve mechanism. The first bypass valve (50) is configured to be switched between: a first state (shown by a solid line in FIG. 12), in which the first port communicates with the second port and is shut off from the third port; and a second state (shown by a broken line in FIG. 12), in which the first port communicates with the third port and is shut off from the second port.

The first bypass valve (50) is disposed in a middle part of the first inlet pipe (52). The first port of the first bypass valve (50) is connected to the discharge opening of the first pump (36), and the second port of the first bypass valve (50) is connected to the first inlet (42) of the first separation module (41) via the first cooling pipe (131). The inlet end of the first bypass pipe (51) is connected to the third port of the first bypass valve (50). The outlet end of the first bypass pipe (51) is connected to the first primary-side pipe (53). The first bypass pipe (51) constitutes a first bypass passage.

The first pressure sensor (45) and the first control valve (46) are provided in the first primary-side pipe (53). The first pressure sensor (45) and the first control valve (46) are disposed closer to the first separation module (41) than the other end of the first bypass pipe (51) connected to the first primary-side pipe (53). The first pressure sensor (45) is disposed closer to the first separation module (41) than the first control valve (46).

The first pressure sensor (45) measures the pressure of first external air flowed out from the first primary-side outlet (43) of the first separation module (41). The measurement value of the first pressure sensor (45) is substantially equal to the pressure of untreated external air that the first pump (36) supplies to the first separation module (41).

The first control valve (46) is a motor-operated valve whose opening degree is variable and constitutes a first valve mechanism. When the opening degree of the first control valve (46) is changed, the pressure of untreated external air that the first pump (36) supplies to the first separation module (41) changes.

The first separation module (41) constitutes a first separating unit. As will be described below in detail, the first separation module (41) includes separation membranes (85). The first separation module (41) separates untreated external air into first external air, which has not permeated through the separation membranes (85), and second external air, which has permeated through the separation membranes (85).

First external air is a gas that has a higher nitrogen concentration than untreated external air and has a lower oxygen concentration than untreated external air. Second external air is a gas that has a lower nitrogen concentration than untreated external air and has a higher oxygen concentration than untreated external air. Thus, the first external air and the second external air differ from each other in the concentrations of constituent substances thereof. In the present specification, the term "concentration" means volume ratio.

<Second Composition Adjuster>

The second composition adjuster (60) is configured to separate internal air (untreated internal air) sucked from the internal space of the transport container (1), which is second air-to-be-treated, into first internal air and second internal air. The second composition adjuster (60) according to the present embodiment supplies the first internal air, which is supply air, to the freight chamber (5), and discharges the second internal air, which is discharge air, to the outside of the transport container (1).

The second composition adjuster (60) includes a second separation module (second separating unit) (61), a second bypass valve (70), a second pressure sensor (65), and a second control valve (66). The second composition adjuster (60) includes a second inlet pipe (72), a second primary-side pipe (73), a second secondary-side pipe (74), and a second bypass pipe (71). The second pump (37) of the pump unit (35) constitutes the second composition adjuster (60).

Between the second bypass valve (70) and the second separation module (61), a second cooling pipe (132), which passes through the secondary passage (29b) of the internal air passage (29), is connected. The second cooling pipe (132) and structures related thereto will be described below.

As will be described below in detail, the second separation module (61) includes a second inlet (62), a second primary-side outlet (63), and a second secondary-side outlet (64). The second inlet (62) is connected to the discharge opening of the second pump (37) via the second cooling pipe (132) and the second inlet pipe (72). The second primary-side outlet (63) is connected to the supply pipe (120) via the second primary-side pipe (73). One end of the second secondary-side pipe (74) is connected to the second secondary-side outlet (64). The second secondary-side pipe (74) extends to the outside of the unit case (32). The other end of the second secondary-side pipe (74) opens in the external machine chamber (28) on the suction side of the external fan (16). The internal-side suction pipe (75) is connected to the suction opening of the second pump (37).

The second bypass valve (70) is a switching valve having three ports and constitutes a second bypass valve mechanism. The second bypass valve (70) is configured to be switched between: a first state (shown by a solid line in FIG. 12), in which the first port communicates with the second port and is shut off from the third port; and a second state (shown by a broken line in FIG. 12), in which the first port communicates with the third port and is shut off from the second port.

The second bypass valve (70) is disposed in a middle part of the second inlet pipe (72). The first port of the second bypass valve (70) is connected to the discharge opening of the second pump (37), and the second port of the second bypass valve (70) is connected to the second inlet (62) of the second separation module (61) via the second cooling pipe (132). The inlet end of the second bypass pipe (71) is connected to the third port of the second bypass valve (70). The outlet end of the second bypass pipe (71) is connected to the second primary-side pipe (73). The second bypass pipe (71) constitutes a second bypass passage.

The second pressure sensor (65) and the second control valve (66) are provided in the second primary-side pipe (73). The second pressure sensor (65) and the second control valve (66) are disposed closer to the second separation module (61) than the other end of the second bypass pipe (71) connected to the second primary-side pipe (73). The second pressure sensor (65) is disposed closer to the second separation module (61) than the second control valve (66).

The second pressure sensor (65) measures the pressure of second external air flowed out from the second primary-side outlet (63) of the second separation module (61). The measurement value of the second pressure sensor (65) is substantially equal to the pressure of untreated internal air that the second pump (37) supplies to the second separation module (61).

The second control valve (66) is a motor-operated valve whose opening degree is variable and constitutes a second valve mechanism. When the opening degree of the second control valve (66) is changed, the pressure of untreated internal air that the second pump (37) supplies to the second separation module (61) changes.

The second separation module (61) constitutes a second separating unit. As will be described below in detail, the second separation module (61) includes separation membranes (85). The second separation module (61) separates untreated internal air into first internal air, which has not permeated through the separation membranes (85), and second internal air, which has permeated through the separation membranes (85).

First internal air is a low-oxygen-concentration and low-carbon-dioxide-concentration gas that has a higher nitrogen concentration than untreated internal air and has a lower oxygen concentration and a lower carbon dioxide concentration than untreated internal air. Second internal air is a high-oxygen-concentration and high-carbon-dioxide-concentration gas that has a lower nitrogen concentration than untreated internal air and has a higher oxygen concentration and a higher carbon dioxide concentration than untreated internal air. Thus, the first internal air and the second internal air differ from each other in the concentrations of constituent substances thereof.

<Separation Module>

Figure 13:
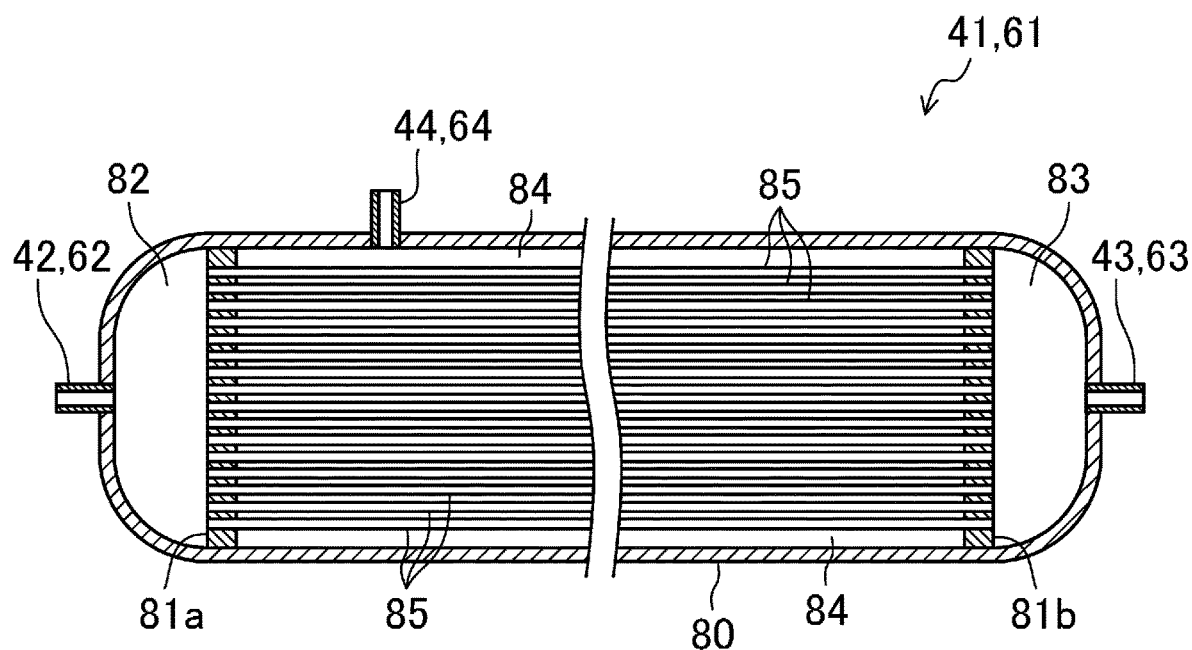
FIG. 13 is a schematic sectional view of a separation module provided in the internal air adjustment device according to the second embodiment.

Referring to FIG. 13, the structure of the first separation module (41) and the second separation module (61) will be described. The first separation module (41) and the second separation module (61) have the same structure.

Each of the separation modules (41, 61) includes one tubular case (80) and two partition walls (81a, 81b). The tubular case (80) is an elongated cylindrical vessel both ends of which are closed. The partition walls (81a, 81b) are members for partitioning the internal space of the tubular case (80) and are provided so as to extend across the internal space of the tubular case (80). The partition walls (81a, 81b) are disposed respectively at a position near one end and a position near the other end of the internal space of the tubular case (80). In FIG. 13, the internal space of the tubular case (80) is partitioned into an inlet chamber (82) that is positioned on the left side of the left partition wall (81a), a secondary-side outlet chamber (84) that is positioned between the two partition walls (81a, 81b), and a primary-side outlet chamber (83) that is positioned on the right side of the right partition wall (81b).

Each of the separation modules (41, 61) includes a large number of hollow-fiber separation membranes (85) (each shaped like a very thin tube having an outside diameter of 1 mm or smaller). The hollow-fiber separation membranes (85) are provided so as to extend from one of one partition wall (81a) to the other partition wall (81b). One end portion of each separation membrane (85) extends through the one partition wall (81a) and opens in the inlet chamber (82), and the other end portion of each separation membrane (85) extends through the other partition wall (81b) and opens in the primary-side outlet chamber (83). A part of the internal space of the tubular case (80) that is interposed between the two partition walls (81a, 81b) and that is outside of the separation membranes (85) constitutes the secondary-side outlet chamber (84). In each of the separation modules (41, 61), the inlet chamber (82) and the primary-side outlet chamber (83) communicate with each other via the hollow-fiber separation membranes (85), while the secondary-side outlet chamber (84) does not communicate with the spaces inside of the separation membranes (85), the inlet chamber (82), and the primary-side outlet chamber (83).

In the tubular case (80), the inlet (42, 62), the primary-side outlet (43, 63), and the secondary-side outlet (44, 64) are provided. The inlet (42, 62) is disposed in a left end portion of the tubular case (80) in FIG. 13, and communicates with the inlet chamber (82). The primary-side outlet (43, 63) is disposed in a right end portion of the tubular case (80) in FIG. 13, and communicates with the primary-side outlet chamber (83). The secondary-side outlet (44, 64) is disposed in a middle part of the tubular case (80) in the longitudinal direction, and communicates with the secondary-side outlet chamber (84).

Each separation membrane (85) is a porous membrane made of a polymer. The separation membrane (85) separates substances included in a gas by using the difference in rate (permeation rate) at which molecules of the substances permeate through the separation membrane (85).

In the internal air adjustment device (30) according to the present embodiment, the same separation membranes (85) are provided in the first separation module (41) and the second separation module (61) respectively. The separation membranes (85) of each of the separation modules (41, 61) have a property that the nitrogen permeation rate is lower than both of the oxygen permeation rate and the carbon dioxide permeation rate. The large number of hollow-fiber separation membranes (85) have substantially the same membrane thickness. Accordingly, the separation membranes (85) provided in each of the separation modules (41, 61) have a property that the nitrogen permeability is lower than both of the oxygen permeability and the carbon dioxide permeability.

In each of the separation modules (41, 61), air-to-be-treated flowed into the inlet chamber (82) through the inlet (42, 62) flows in the spaces inside of the hollow-fiber separation membranes (85) toward the primary-side outlet chamber (83). A part of air-to-be-treated that flows in the spaces inside of the separation membranes (85) permeates through the separation membranes (85) and moves to the secondary-side outlet chamber (84), and the remaining part of the air-to-be-treated flows into the primary-side outlet chamber (83).

The separation membranes (85) of each of the separation modules (41, 61) have a nitrogen permeability lower than the oxygen permeability and the carbon dioxide permeability. That is, nitrogen does not easily permeate through the separation membrane (85) compared with oxygen and carbon dioxide. Therefore, as air-to-be-treated that flows in the inside of the hollow-fiber separation membranes (85) approaches the primary-side outlet chamber (83), the nitrogen concentration increases, and simultaneously the oxygen concentration and the carbon dioxide concentration decrease. Oxygen and carbon dioxide included in air-to-be-treated that flows in the hollow-fiber separation membranes (85) permeate through the separation membranes (85) and move to the secondary-side outlet chamber (84).

As a result, treated air flowed into the primary-side outlet chamber (83) without permeating through the separation membranes (85) has a higher nitrogen concentration than air-to-be-treated in the inlet chamber (82), and has a lower oxygen concentration and a lower carbon dioxide concentration than air-to-be-treated in the inlet chamber (82). Treated air permeated through the separation membranes (85) and moved to the secondary-side outlet chamber (84) has a lower nitrogen concentration than air-to-be-treated in the inlet chamber (82), and has a higher oxygen concentration and a higher carbon dioxide concentration than air-to-be-treated in the inlet chamber (82).

In the first separation module (41), untreated external air flows from the first inlet (42) into the inlet chamber (82), treated air flowed into the primary-side outlet chamber (83) without permeating through the separation membranes (85) flows out from the first primary-side outlet (43) as first external air, and treated air permeated through the separation membranes (85) and flowed into the secondary-side outlet chamber (84) flows out from the first secondary-side outlet (44) as second external air. In the second separation module (61), untreated internal air flows from the second inlet (62) into the inlet chamber (82), treated air flowed into the primary-side outlet chamber (83) without permeating through the separation membranes (85) flows out from the second primary-side outlet (63) as first internal air, and treated air permeated through the separation membranes (85) and flowed into the secondary-side outlet chamber (84) flows out from the second secondary-side outlet (64) as second internal air.

<Sensor Unit>

As illustrated in FIGS. 10 and 12, the sensor unit (90) is disposed in the secondary passage (29b) of the internal air passage (29) of the container refrigerator (10). As illustrated in FIG. 12, the sensor unit (90) includes an oxygen sensor (91), a carbon dioxide sensor (92), and a sensor case (93).

The oxygen sensor (91) is a zirconia electric-current sensor that measures the oxygen concentration of a mixed gas such as air. The carbon dioxide sensor (92) is a non-dispersive infrared (NDIR) sensor that measures the carbon dioxide concentration of a mixed gas such as air. The oxygen sensor (91) and the carbon dioxide sensor (92) are contained in the sensor case (93).

The sensor case (93) is a slightly elongated box-shaped member. The outlet end of the measurement pipe (125) is connected to one end of the sensor case (93) in the longitudinal direction, and one end of an outlet pipe (95) is connected to the other end of the measurement pipe (125). The other end of the outlet pipe (95) opens in the primary passage (29a) of the internal air passage (29). An air filter (94), for introducing internal air that flows in the internal air passage (29) into the internal space of the sensor case (93), is attached to the sensor case (93). The air filter (94) is a membrane filter for trapping dust and the like included in internal air.

While the internal fan (17) is operating, the air pressure of the secondary passage (29b) is slightly higher than the air pressure of the primary passage (29a). Therefore, when the measurement on-off valve (126) is in a closed state, internal air of the secondary passage (29b) flows into the sensor case (93) through the air filter (94), and then flows into the primary passage (29a) through the outlet pipe (95). In this state, the oxygen sensor (91) of the sensor unit (90) measures the oxygen concentration of internal air, and the carbon dioxide sensor (92) of the sensor unit (90) measures the carbon dioxide concentration of internal air.

<Ventilation Discharge Pipe>

The ventilation discharge pipe (100) is a pipe for connecting the inside and the outside of the transport container (1) to each other. The ventilation discharge pipe (100) constitutes a ventilation discharge passage. As illustrated in FIG. 10, the ventilation discharge pipe (100) extends through the casing (20) of the container refrigerator (10). One end of the ventilation discharge pipe (100) opens in the secondary passage (29b) of the internal air passage (29). The other end of the ventilation discharge pipe (100) opens in the external machine chamber (28) on the suction side of the external fan (16).

As illustrated in FIG. 12, an air filter (102) is attached to one end of the ventilation discharge pipe (100). The air filter (102) is a membrane filter for trapping dust and the like included in internal air. A ventilation discharge valve (101) is provided in the ventilation discharge pipe (100). The ventilation discharge valve (101) is an electromagnetic on-off valve.

<Supply Air Humidifying Structure>

<Air Path>

In the present embodiment, a humidifying structure (130) for humidifying supply air is provided as a humidifier of the present disclosure. The humidifying structure (130) is provided in an air path (135) that is constituted by the external-side suction pipe (55), the first inlet pipe (52), the first cooling pipe (131), the first primary-side pipe (53), the internal-side suction pipe (75), the second inlet pipe (72), the second cooling pipe (132), the second primary-side pipe (73), and the supply pipe (120). In the present embodiment, the air path (135) includes a path on the upstream side along which air-to-be-treated is guided into the separating unit (41, 61), and a path on the downstream side (the supply pipe (120)) along which supply air treated by the separating unit (41, 61) flows to the internal space (5).

The humidifying structure (130) includes a cooling unit (140), a water extracting unit (150), and a humidifying unit (160). The air path (135) is a path that communicates from the first separation module (41) and the second separation module (61), which are separating units (a first separating unit and a second separating unit), to the internal space. In the air path (135), a heating unit (170), for heating air-to-be-treated that flows into the first separation module (41) and the second separation module (61), is also provided.

<Cooling Unit>

In the cooling unit (140), the first cooling pipe (131) and the second cooling pipe (132) of the air path (135) are passed near the evaporator (15), which is shown in FIG. 12 at two positions for convenience of illustration. The cooling unit (140) is configured to cool supply air, which is supplied from the air path (135) to the internal space, by using cold energy generated by the container refrigerator (10). The cooling unit (140) is provided on the upstream side of the first and second separating units (41, 61) in the air path (135). To be specific, the first cooling pipe (131), which is provided in the air path (135) and which passes through the internal space between the first bypass valve (50) and the first separation module (41), is disposed so as to pass near the evaporator (15), and thus a first cooling unit (141) is constituted. The second cooling pipe (132), which is provided in the air path (135) and which passes through the internal space between the second bypass valve (70) and the second separation module (61), is disposed so as to pass near the evaporator (15), and thus a second cooling unit (142) is constituted.

<Water Extracting Unit>

When supply air (air-to-be-treated) that flows through the air path (135) is cooled by the cooling unit (140) to the dew-point temperature or lower, water in supply air is extracted as drain water from the water extracting unit (150) provided in the air path (135). As the water extracting unit (150), for example, a first water filter (151) and a second water filter (152), each of which is commercially available, are used. The first water filter (151) is provided in the first cooling pipe (131), and the second water filter (152) is provided in the second cooling pipe (132).

The water filter is configured so that, for example, when a predetermined amount of condensation water is stored in a tank, a valve provided in a lower part thereof opens and the water is discharged from a discharge opening. The first water filter (151) and the second water filter (152) are disposed on the downstream side of the cooling unit (141, 142) in the air path (135).

<Humidifying Unit>

Figure 16:
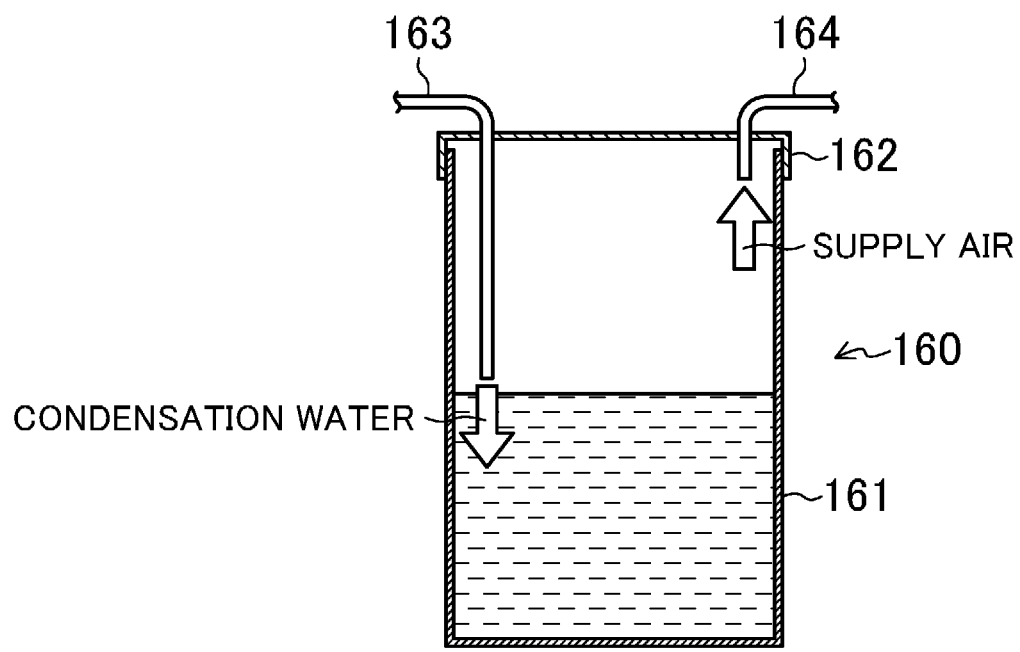
FIG. 16 is a schematic longitudinal sectional view of a humidifying section (humidifying unit).

Although not illustrated in FIG. 12, a humidifying section (160) is connected to the discharge opening of each of the water filters (the water extracting unit (150)), via, for example, a connection pipe such as a tube. The humidifying section (160) is disposed on the path of the air path (135), and, to be specific, is connected to the supply pipe (120). As illustrated in FIG. 16, the humidifying section (160), which is a humidifying unit, includes a humidifying tank (161), a cover member (162), a water inflow pipe (163) from each water filter (the water extracting unit (150)), and an air outflow pipe (164) from which supply air flowed into the humidifying tank (161) flows out. An air inflow pipe, from which supply air flows into the humidifying tank (161), is omitted.

In the humidifying section (160), condensation water is stored in a lower part of the humidifying tank (161). An upper part of the humidifying tank (161) is a space in which supply air to be supplied to the internal space is temporarily stored, and a pump pressure acts on the upper part. Accordingly, water is provided to supply air, which is to be supplied to the internal space, inside of the humidifying tank (161), and the supply air, which is a humidified low-oxygen concentration gas, is introduced into the internal space.

<Heating Unit>

The heating unit (170) is provided in the air path (135) so as to heat air-to-be-treated between the cooling unit (140) and the separating unit (41, 61). To be specific, a first heating unit (171) is provided between the first cooling unit (141) and the first separation module (41), and a second heating unit (172) is provided between the second cooling unit (142) and the second separation module (61). The first heating unit (171) and the second heating unit (172) are configured by passing the air path (135), which is on the inflow side of the first separation module (41) and the second separation module (61), near the condenser (13) of the external machine chamber (28), which is illustrated at two positions in FIG. 10 for convenience of illustration. Since air-to-be-treated that flows into the first separation module (41) and the second separation module (61) is heated by heating energy of the condenser, the separation membranes (85) of each separation module (41, 61) can be suppressed from being cooled.

With the present embodiment, the separating unit (the first separation module (41) and the second separation module (61)) can separate low-oxygen concentration supply air from external air, which is first air-to-be-treated, and the humidifying unit (160) can humidify the supply air.

In the present embodiment, the separating unit (the first separation module (41) and the second separation module (61)) can separate low-oxygen-concentration and low-carbon-dioxide-concentration supply air from internal air, which is second air-to-be-treated, and the humidifying unit (160) can humidify the supply air.

In the present embodiment, the first separating unit (41) is a separating unit that separates supply air from external air that is air-to-be-treated; and the second separating unit (61) is a separating unit that separates supply air from internal air that is air-to-be-treated. The humidifying unit (160) can humidify both of supply air generated by the first separating unit (41) from external air and supply air that is generated by the second separating unit (61) from internal air without receiving supply of water.

In the present embodiment, the pump unit (35) constitutes a pressurizing unit (180) that pressurizes air-to-be-treated on the upstream side of the cooling unit (140) in the air path (135).

<Controller>

The controller (110) includes a CPU (111) that performs a control operation and a memory (112) that stores data and the like that are necessary for the control operation. Measurement values of the oxygen sensor (91), the carbon dioxide sensor (92), the first pressure sensor (45), and the second pressure sensor (65) are input to the controller (110). The controller (110) performs a control operation for operating the pump unit (35), the first control valve (46), the second control valve (66), the first bypass valve (50), the second bypass valve (70), and the ventilation discharge valve (101). While the controller (110) is performing the control operation, the humidifying structure (130) performs an operation of suppressing decrease of the humidity of the internal space without receiving supply of water.

—Operation of Container Refrigerator—

The container refrigerator (10) performs a cooling operation of cooling internal air of the transport container (1).

In the cooling operation, the compressor (12) of the refrigerant circuit (11) is activated, a refrigerant circulates in the refrigerant circuit (11), and thus a vapor compression refrigeration cycle is performed. In the refrigerant circuit (11), a refrigerant discharged from the compressor (12) passes through the condenser (13), the expansion valve (14), and the evaporator (15) in order, and then is sucked into the compressor (12) and compressed.

In the cooling operation, the external fan (16) and the internal fan (17) are activated. When the external fan (16) is activated, external air outside of the transport container (1) is sucked into the external machine chamber (28) and passes through the condenser (13). In the condenser (13), the refrigerant releases heat to the external air and condenses. When the internal fan (17) is activated, internal air in the freight chamber (5) of the transport container (1) is sucked into the internal air passage (29) and passes through the evaporator (15). In the evaporator (15), the refrigerant absorbs heat from the internal air and evaporates.

Flow of internal air will be described. Internal air that is present in the freight chamber (5) flows into the primary passage (29a) of the internal air passage (29) through the suction opening (26), and is blown out to the secondary passage (29b) by the internal fan (17). The internal air flowed into the secondary passage (29b) is cooled while passing through the evaporator (15), then is blow out from the blow-out opening (27) to the underfloor passage (4), and flows into the freight chamber (5) through the underfloor passage (4).

In the internal air passage (29), the primary passage (29a) is positioned on the suction side of the internal fan (17), and the secondary passage (29b) is positioned on the blow-out side of the internal fan (17). Therefore, while the internal fan (17) is operating, the air pressure in the secondary passage (29b) is slightly higher than the air pressure in the primary passage (29a).

—Operation of Internal Air Adjustment Device—

The internal air adjustment device (30) performs an operation for adjusting the composition of internal air (in the present embodiment, the oxygen concentration and the carbon dioxide concentration of internal air) in the freight chamber (5) of the transport container (1). Here, regarding the operation of the internal air adjustment device (30) according to the present embodiment, a case where the target range of the oxygen concentration of internal air is 5%±1% and the target range of the carbon dioxide concentration of internal air is 2%±1% will be described as an example.

<Outline of Operation of Internal Air Adjustment Device>

The internal air adjustment device (30) according to the present embodiment performs: an oxygen concentration reducing operation for reducing the oxygen concentration of internal air in the freight chamber (5); a carbon dioxide concentration reducing operation for reducing the carbon dioxide concentration of internal air in the freight chamber (5); and an oxygen concentration increasing operation for increasing the oxygen concentration of internal air in the freight chamber (5).

At the time when loading of the freight (6) on the transport container (1) has been finished, the composition of internal air that is present in the freight chamber (5) is substantially the same as the composition of the atmosphere (nitrogen concentration: 78%, oxygen concentration: 21%, carbon dioxide concentration: 0.04%). Therefore, the internal air adjustment device (30) performs an oxygen concentration reducing operation for reducing the oxygen concentration of internal air. When the oxygen concentration of internal air reaches the upper limit value (6%) of the target range, the internal air adjustment device (30) stops the oxygen concentration reducing operation.

After the oxygen concentration of internal air has reached 6% and the internal air adjustment device (30) has stopped the oxygen concentration reducing operation, the oxygen concentration of internal air gradually decreases and simultaneously the carbon dioxide concentration of internal air gradually increases due to respiration of plants that are the freight (6).

When the carbon dioxide concentration of internal air reaches the upper limit value (3%) of the target range, the internal air adjustment device (30) performs a carbon dioxide concentration reducing operation for reducing the carbon dioxide concentration of internal air. When the carbon dioxide concentration of internal air reaches the lower limit value (1%) of the target range, the internal air adjustment device (30) stops the carbon dioxide concentration reducing operation.

When the oxygen concentration of internal air reaches the lower limit value (4%) of the target range, the internal air adjustment device (30) performs an oxygen concentration increasing operation for increasing the oxygen concentration of internal air. When the oxygen concentration of internal air reaches the upper limit value (6%) of the target range, the internal air adjustment device (30) stops the oxygen concentration increasing operation.

Thus, the internal air adjustment device (30) performs an oxygen concentration reducing operation to reduce the oxygen concentration of internal air in the freight chamber (5) from 21% (the oxygen concentration of the atmosphere) to a level within the target range. Moreover, the internal air adjustment device (30) repeatedly performs, as necessary, the carbon dioxide concentration reducing operation and the oxygen concentration increasing operation in order to maintain the oxygen concentration and the carbon dioxide concentration of internal air in the freight chamber (5) respectively at levels within their target ranges.

<Oxygen Concentration Reducing Operation>

Figure 14:
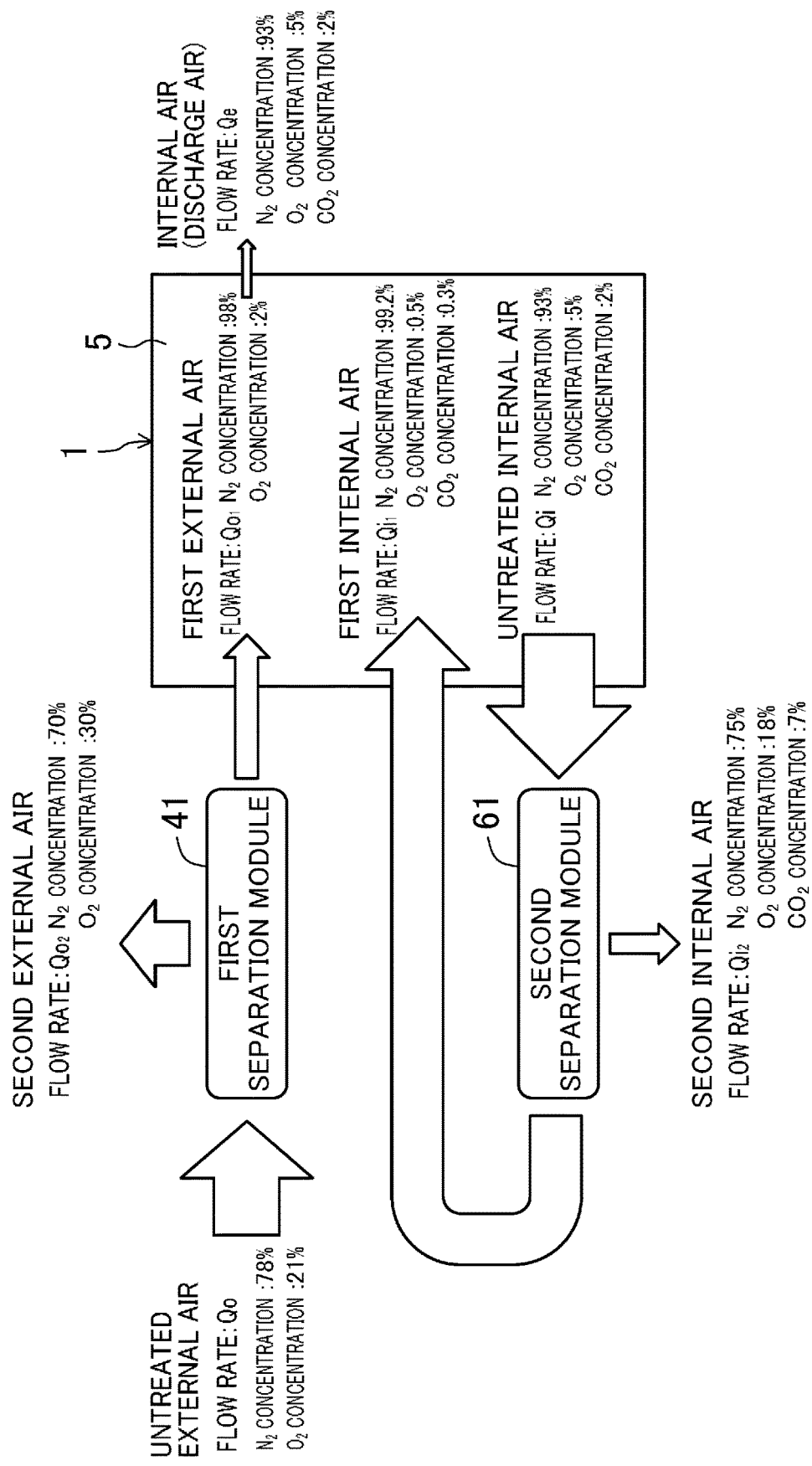
FIG. 14 is a block diagram illustrating an oxygen concentration reducing operation performed by the internal air adjustment device according to the second embodiment.

Referring to FIGS. 12 to 14 as necessary, the oxygen concentration reducing operation of the internal air adjustment device (30) will be described. In the oxygen concentration reducing operation, the first composition adjuster (40) supplies first external air (supply air), which has a low oxygen concentration, to the freight chamber (5); and the second composition adjuster (60) supplies first internal air (supply air), which has a low oxygen concentration, to the freight chamber (5).

In the oxygen concentration reducing operation, the controller (110) sets each of the first bypass valve (50) and the second bypass valve (70) to be in a first state (the state shown by a solid line in FIG. 12), activates the first pump (36) and the second pump (37) by energizing the driving motor (38) of the pump unit (35), and sets the ventilation discharge valve (101) to be in an open state.

First, when the first pump (36) is activated, external air that is present outside of the transport container (1) is sucked into the first pump (36) through the air filter (47) and the external-side suction pipe (55). The first pump (36) compresses and discharges the sucked external air. The pressure of external air discharged by the first pump (36) is about twice the atmospheric pressure. The external air discharged from the first pump (36) flows in the first inlet pipe (52), and, after passing through the first cooling pipe (131), flows into the first inlet (42) of the first separation module (41) as untreated external air. Action when untreated external air passes through the first cooling pipe (131) will be described below.

In the first separation module (41), untreated external air flowed into the inlet chamber (82) through the first inlet (42) flows into the hollow-fiber separation membranes (85). A part of untreated external air that flows in the inside of the hollow-fiber separation membranes (85) permeates through the separation membranes (85) and moves to the secondary-side outlet chamber (84) as second external air, and the remaining part of the air flows into the primary-side outlet chamber (83) as first external air. As described above, the separation membranes (85) have a characteristic such that the nitrogen permeability is lower than the oxygen permeability. Therefore, as illustrated in FIG. 5, the oxygen concentration of first external air is lower than the oxygen concentration of untreated external air, and the oxygen concentration of second external air is higher than the oxygen concentration of untreated external air.

First external air flowed out from the first primary-side outlet (43) of the first separation module (41) to the first primary-side pipe (53) flows into the supply pipe (120). Second external air flowed out from the first secondary-side outlet (44) of the first separation module (41) to the first secondary-side pipe (54) is discharged to the outside of the transport container (1).

Next, when the second pump (37) is activated, internal air that is present inside of the transport container (1) (to be specific, the secondary passage (29b) of the container refrigerator (10)) is sucked into the second pump (37) through the internal-side suction pipe (75). The second pump (37) compresses and discharges the sucked internal air. The pressure of internal air discharged by the second pump (37) is slightly higher than the atmospheric pressure. Internal air discharged from the second pump (37) flows in the second inlet pipe (72), and, after passing through the second cooling pipe (132), flows into the second inlet (62) of the second separation module (61) as untreated internal air. Action when untreated internal air passes through the second cooling pipe (132) will be described below.

In the second separation module (61), untreated internal air flowed into the inlet chamber (82) through the second inlet (62) flows into the hollow-fiber separation membranes (85). A part of untreated internal air that flows in the inside of the hollow-fiber separation membranes (85) permeates through the separation membranes (85) and moves to the secondary-side outlet chamber (84) as second internal air, and the remaining part of the air flows into the primary-side outlet chamber (83) as first internal air. As described above, the separation membranes (85) have a characteristic such that the nitrogen permeability is lower than the oxygen permeability. Therefore, as illustrated in FIG. 14, the oxygen concentration of first internal air is lower than the oxygen concentration of untreated internal air, and the oxygen concentration of second external air is higher than the oxygen concentration of untreated internal air.

First internal air flowed out from the second primary-side outlet (63) of the second separation module (61) to the second primary-side pipe (73) flows into the supply pipe (120). Second internal air flowed out from the second secondary-side outlet (64) of the second separation module (61) to the second secondary-side pipe (74) is discharged to the outside of the transport container (1).

As described above, first external air flowed out from the first separation module (41) and first internal air flowed out from the second separation module (61) flow into the supply pipe (120) (first external air and first internal air each have a lower oxygen concentration after being treated than before being treated). Then, mixed air of first external air and first internal air that flows in the supply pipe (120) flows into the secondary passage (29b) of the container refrigerator (10), and is supplied to the freight chamber (5) together with internal air that flows in the secondary passage (29b).

Usually, during the oxygen concentration reducing operation, the flow rate Qo1 of first external air supplied from the outside to the inside of the transport container (1) is higher than the flow rate Qi2 of second internal air discharged from the inside to the outside of the transport container (1) (Qo1>Qi2), and the air pressure in the transport container (1) is a positive pressure (see FIG. 14). That is, the first composition adjuster (40) supplies first external air to the inside of the transport container (1) so that the air pressure in the transport container (1) becomes a positive pressure. Because the air pressure in the transport container (1) is a positive pressure, a part of internal air is discharged to the outside of the transport container (1) through the ventilation discharge pipe (100).

Thus, in the oxygen concentration reducing operation, the oxygen concentration of internal air in the freight chamber (5) is reduced by supplying first external air, which has a lower oxygen concentration than the atmosphere, and simultaneously discharging internal air in the freight chamber (5) to the outside of the transport container (1) through the ventilation discharge pipe (100). Moreover, in the oxygen concentration reducing operation, the oxygen concentration of internal air in the freight chamber (5) is reduced by discharging second internal air, which has been separated from untreated internal air and which has a high oxygen concentration, to the outside of the transport container (1).

<Carbon Dioxide Concentration Reducing Operation>

Figure 15:
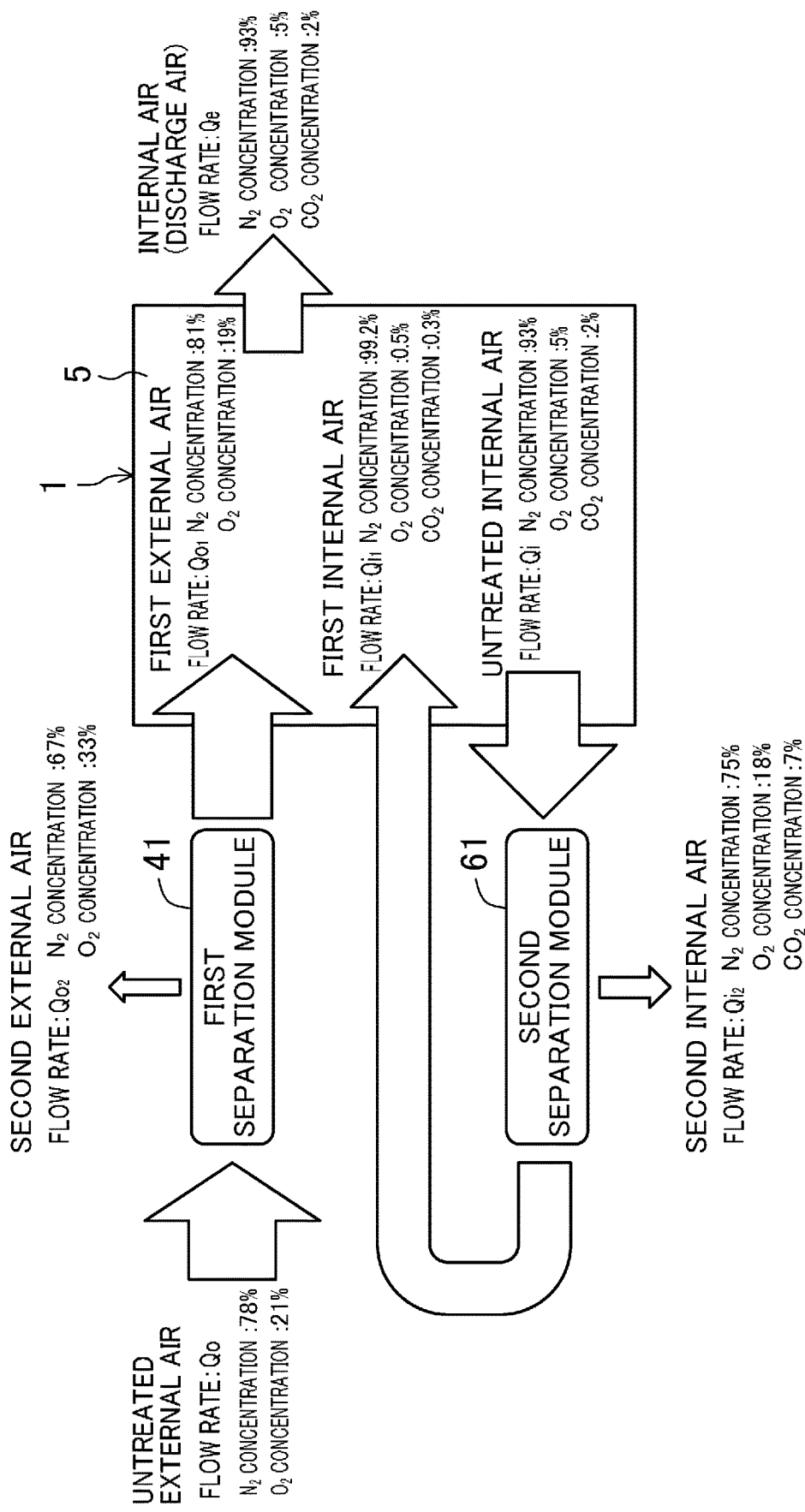
FIG. 15 is a block diagram illustrating a carbon dioxide concentration reducing operation performed by the internal air adjustment device according to second the embodiment.

Referring to FIGS. 12, 13, and 15 as necessary, the carbon dioxide concentration reducing operation of the internal air adjustment device (30) will be described. In the carbon dioxide concentration reducing operation, the first composition adjuster (40) supplies first external air (supply air), which has a low oxygen concentration, to the freight chamber (5); and the second composition adjuster (60) supplies first internal air (supply air), which has a low carbon dioxide concentration, to the freight chamber (5).

In the carbon dioxide concentration reducing operation, the controller (110) sets each of the first bypass valve (50) and the second bypass valve (70) to be in a first state (the state shown by a solid line in FIG. 12), activates the first pump (36) and the second pump (37) by energizing the driving motor (38) of the pump unit (35), sets the ventilation discharge valve (101) to be in an open state, and sets the measurement on-off valve (126) to be in a closed state. In each of the first composition adjuster (40) and the second composition adjuster (60), external air and internal air flow in the same way as in the oxygen concentration reducing operation. However, in the carbon dioxide concentration reducing operation, the pressure of external air discharged by the first pump (36) and the pressure of internal air discharged by the second pump (37) are each slightly higher than the atmospheric pressure.

In the first composition adjuster (40), untreated external air flowed into the first separation module (41) is separated into: first external air, which has a higher nitrogen concentration and a lower oxygen concentration than untreated external air; and second external air, which has a lower nitrogen concentration and a higher oxygen concentration than untreated external air. Then, the first external air (supply air) is supplied to the inside of the transport container (1), and the second external air (discharge air) is discharged to the outside of the transport container (1). The carbon dioxide concentration of untreated external air is substantially the same as the carbon dioxide concentration of the atmosphere (0.04%). Therefore, the carbon dioxide concentration of the first external air can be regarded as substantially zero.

In the second composition adjuster (60), untreated internal air flowed into the second separation module (61) is separated into: first internal air, which has a higher nitrogen concentration, a lower oxygen concentration, and a lower carbon dioxide concentration than untreated internal air; and second internal air, which has a lower nitrogen concentration, a higher oxygen concentration, and a higher carbon dioxide concentration than untreated internal air. Then, the first internal air (supply air) is supplied to the inside of the transport container (1), and the second internal air (discharge air) is discharged to the outside of the transport container (1).

Usually, during the carbon dioxide concentration reducing operation, as with the oxygen concentration reducing operation, the flow rate Qo1 of first external air is higher than the flow rate Qi2 of second internal air (Qo1>Qi2), and the air pressure in the transport container (1) is a positive pressure (see FIG. 15). That is, the first composition adjuster (40) supplies first external air to the inside of the transport container (1) so that the air pressure in the transport container (1) becomes a positive pressure. Because the air pressure in the transport container (1) is a positive pressure, a part of internal air in the freight chamber (5) is discharged to the outside of the transport container (1) through the ventilation discharge pipe (100).

Thus, in the carbon dioxide concentration reducing operation, the carbon dioxide concentration of internal air in the freight chamber (5) is reduced by supplying first external air, which has an extremely low carbon dioxide concentration, and simultaneously discharging internal air to the outside of the transport container (1) through the ventilation discharge pipe (100). Moreover, in the carbon dioxide concentration reducing operation, the carbon dioxide concentration of internal air in the freight chamber (5) is reduced by discharging second internal air, which has been separated from untreated internal air and which has a high carbon dioxide concentration, to the outside of the transport container (1).

<Oxygen Concentration Increasing Operation>

Referring to FIG. 12, the oxygen concentration increasing operation of the internal air adjustment device (30) will be described. In the oxygen concentration increasing operation, external air sucked by the first composition adjuster (40) from the outside of the transport container (1) is supplied as it is to the freight chamber (5), and internal air sucked by the second composition adjuster (60) from the inside of the transport container (1) is returned as it is to the freight chamber (5).

In the oxygen concentration increasing operation, the controller (110) sets each of the first bypass valve (50) and the second bypass valve (70) to be in a second state (the state shown by a broken-line in FIG. 12), activates the first pump (36) and the second pump (37) by energizing the driving motor (38) of the pump unit (35), sets the ventilation discharge valve (101) to be in an open state, and sets the measurement on-off valve (126) to be in a closed state.

In the first composition adjuster (40), external air (in this case, untreated external air is supply air) discharged from the first pump (36) flows into the first bypass pipe (51), flows into the first primary-side pipe (53) in a state in which the nitrogen concentration and the oxygen concentration thereof are maintained, and then is supplied to the inside of the transport container (1) through the supply pipe (120). In the second composition adjuster (60), internal air (in this case, untreated internal air is supply air) sucked into the second pump (37) is discharged from the second pump (37), flows into the second primary-side pipe (73) through the second bypass pipe (71), and then returns to the inside of the transport container (1) through the supply pipe (120). A part of internal air in the freight chamber (5) is discharged to the outside of the transport container (1) through the ventilation discharge pipe (100).

Thus, in the oxygen concentration increasing operation, the oxygen concentration in the freight chamber (5) is increased by supplying external air, which has a higher oxygen concentration than internal air, to the inside of the transport container (1).

—Control Operation of Controller—

The controller (110) of the internal air adjustment device (30) monitors the measurement values of the oxygen sensor (91) and the carbon dioxide sensor (92). On the basis of the measurement values of the oxygen sensor (91) and the carbon dioxide sensor (92), the controller (110) controls the constituent equipment of the internal air adjustment device (30) so that the oxygen concentration and the carbon dioxide concentration of internal air are maintained at levels within their respective target ranges as the internal air adjustment device (30) performs the operations described above.

<Action of Humidification and Maintenance of Humidity of Internal Space>

In the oxygen concentration reducing operation and the carbon dioxide concentration reducing operation, when untreated external air and untreated internal air pass through the first separation module (41) and the second separation module (61), the separation membranes (85) separate water in the external air and the internal air together with oxygen and carbon dioxide. Water separated from supply air is included in discharge air and is discharged to the external space together with discharge air. Therefore, the humidity of the internal space decreases as the operation is continued, the amount of water that evaporates from plants, which are the freight (6), increases, and the weight and the quality of the plants may decrease.

In contrast, in the present embodiment, supply air is supplied to the internal space after the humidifying structure (130) has provided water to the supply air via the first cooling pipe (131) and the second cooling pipe (132). Accordingly, decrease of the humidity of the internal space can be suppressed.

<Humidification of Internal Space Performed by Using External Air>

In FIG. 12, when the first pump (36) is activated, external air that exists outside of the transport container (1) is sucked into the first pump (36) through the air filter (47) and the external-side suction pipe (55). The first pump (36) pressurizes and feeds the external air from the first inlet pipe (52) to the first cooling pipe (131). The first cooling pipe (131), in which untreated external air flows, passes near the evaporator (15), which is the first cooling unit (141), in the secondary passage (29b) of the internal air passage (29). Therefore, external air (water-extraction air) in the first cooling pipe (131) is cooled, and a part of water vapor included in the external air condenses.

External air including condensation water passes through the first water filter (151), which is the water extracting unit (150), and, at this time, the condensation water is supplied to the humidifying unit (160) and stored in a lower part of the humidifying tank (161). In the humidifying tank (161), pressurized supply air passes through the space above the stored condensation water, and, at this time, the supply air is humidified. Then, the humidified supply air is supplied to the internal space.

In a case where supply air is humidified by using water in external air, the amount of water vapor supplied to the internal space can be made larger than the amount of water lost in the separation membranes (85). As a result, "humidification" of increasing the humidity of the internal space can be performed without receiving supply of water.

External air that has passed through the first water filter (151) is air including only a small amount of water, the external air is heated by the condenser (13), which is the first heating unit (171), and then flows into the first separation module (41). Accordingly, the temperature of external air that flows into the first separation module (41), which has temporarily decreased, increases in the condenser (13). In addition, since the external air is dry air including only a small amount of water (having a low relative humidity), decrease of the reliability of the separation membranes (85) can be suppressed.

Description of flow of supply air that has passed through the first separation module (41), which has been already given, will be omitted here.

<Maintenance of Humidity of Internal Space Performed by Using Internal Air>

In FIG. 12, when the second pump (37) is activated, internal air that exists inside of the transport container (1) (to be specific, the secondary passage (29b) of the container refrigerator (10)) flows from a filter (not shown), which is provided at the inlet of the internal-side suction pipe (75), into the internal-side suction pipe (75) and is sucked into the second pump (37). The second pump (37) pressurizes and feeds the external air from the second inlet pipe (72) to the second cooling pipe (132). The second cooling pipe (132), in which internal air flows, passes near the evaporator (15), which is the second cooling unit (142), in the secondary passage (29b) of the internal air passage (29). Therefore, internal air (water-extraction air) in the second cooling pipe (132) is cooled, and a part of water vapor included in internal air condenses.

Internal air including condensation water passes through the second water filter (152), which is the water extracting unit (150), and, at this time, the condensation water is supplied to the humidifying unit (160) and stored in a lower part of the humidifying tank (161). In the humidifying tank (161), pressurized supply air passes through the space above the stored condensation water, and, at this time, the supply air is humidified. Then, the humidified supply air is supplied to the internal space.

In a case where supply air is humidified by using water in internal air, an operation of returning water vapor that existed in the inner space to the inner space is performed. As a result, "maintenance of humidity" of maintaining the humidity of the internal space can be performed without receiving supply of water.

Internal air that has passed through the second water filter (152) is air including only a small amount of water, the internal air is heated by the condenser (13), which is the second heating unit (172), and then flows into the second separation module (61). Accordingly, the temperature of internal air that flows into the second separation module (41), which has temporarily decreased, increases in the condenser (13). In addition, since the internal air is dry air including only a small amount of water (having a low relative humidity), decrease of the reliability of the separation membranes (85) can be suppressed.

Description of flow of supply air that has passed through the second separation module (61), which has been already given, will be omitted here.

Advantageous Effects of Second Embodiment

The air composition adjustment device according to the second embodiment includes: the composition adjuster (40, 60) that includes the separating unit (41, 61) that separates supply air, having a composition different from that of air-to-be-treated, from the air-to-be-treated and that supplies the supply air to the inside of the freight chamber (5), which is the target space; the air path (135) that communicates from the separating unit (41, 61) to the freight chamber (5); the cooling unit (140) that cools and dehumidifies air-to-be-treated in the air path (135); the water extracting unit (150) that cools air-to-be-treated that flows through the air path (135) and that extracts generated water; and the humidifying unit (160) that humidifies supply air that is blown into the freight chamber (5) by using water extracted by the water extracting unit (150).

With existing technology, for example, as described in International Publication No. 2007/033668, when water is separated by the separating unit, the internal space becomes dry, and the commercial value of plants, such as agricultural products, may decrease due to decrease of freshness. In contrast, with the second embodiment, as described above, air-to-be-treated that flows through the air path (135) is cooled by the cooling unit (140), and the water extracting unit (150) extracts water from the air-to-be-treated. In the humidifying unit (160), the water humidifies supply air that is blown out to the freight chamber (5). Then, humidified supply air is supplied to the freight chamber (5) through the air path (135). Accordingly, decrease of the humidity of the freight chamber (5) can be suppressed without receiving supply of water, and thus the problem of drying of plants and decrease of commercial value of the plants can be suppressed.

With the present embodiment, water used for humidification is generated from air-to-be-treated that has passed through the filter. If the internal space is humidified by using simple drain water, various germs may propagate. With the present embodiment, since water is extracted from clean air-to-be-treated, such a problem can be also suppressed.

With the present embodiment, since the cooling unit (140) is disposed on the upstream side of the separating unit (41, 61) in the air path (135), air-to-be-treated is cooled in the air path (135) and the amount of water in the air-to-be-treated decreases, and then the air-to-be-treated flows into the separating unit (41, 61). Accordingly, water is not likely to adhere to the separating unit (41, 61), and decrease of the quality of the separating unit (41, 61) can be suppressed.

With the present embodiment, in the air path (135), the heating unit (170) for heating air-to-be-treated is provided between the cooling unit (140) and the separating unit (41, 61). Therefore, air-to-be-treated that flows through the air path (135) is cooled by the cooling unit (140) and the amount of water included in the air-to-be-treated is reduced, and then the air-to-be-treated is heated by the heating unit (170) and flows into the separating unit (41, 61). Accordingly, flow of low-temperature air-to-be-treated into the separating unit (41, 61) can be suppressed, and, by supplying dry air to the separating unit (41, 61), the reliability of the separation membranes (85) can be increased.

With the present embodiment, as the separating unit (41, 61), the first separation module (41) that separates supply air from external air and the second separation module (61) that separates supply air from internal air in the target space (internal space) are used. Drying of the internal space is suppressed by providing water to the supply air by using the humidifying unit (160) and supplying the supply air to the internal space. When external air is used, the amount of water supplied to the internal space can be made larger than the amount of water discharged from the internal space, so that the internal space can be humidified without receiving supply of water. When the internal air is used, the amount of water supplied to the internal space can be made substantially equal to the amount of water discharged from the internal space, so that the humidity of the internal space can be maintained without receiving supply of water.

With the present embodiment, the pump unit (35), which is provided in the air path (135), is used as the pressurizing unit (180) that pressurizes air-to-be-treated on the upstream side of the cooling unit (140). Since air-to-be-treated is pressurized at the position upstream of the cooling unit (140), the volume of the air-to-be-treated is reduced and water can be easily extracted. Accordingly, supply air can be sufficiently humidified, and decrease of quality of plants due to drying of the plants can be more reliably suppressed.

With the present embodiment, supply air is cooled by the evaporator (15) that is already provided in the container refrigerator (10). Accordingly, it is not necessary to provide a dedicated cooling unit, and the configuration can be simplified.

In the embodiment, the cooling unit (140) and the heating unit (170) are provided on the upstream side of the separating unit (41, 61). However, the cooling unit (140) and the heating unit (170) may be provided on the downstream side of the separating unit (41, 61), and supply air may be cooled and heated.

Modifications of Second Embodiment

First Modification

In the second embodiment, the cooling unit (140) is configured so that the first cooling pipe (131) and the second cooling pipe (132) pass near the evaporator (15). For example, the double-pipe heat exchanger (145), which is described in the fifth modification of the first embodiment and shown in FIG. 6, may be used. Description of specific configurations of the double-pipe heat exchanger (145) will be omitted here.

With this configuration, air-to-be-treated that has flowed from the air inflow pipe (148) into the outer pipe (147) is cooled by a low-temperature refrigerant that flows in the inner pipe, and a part of water vapor included in the air-to-be-treated condenses. The air-to-be-treated, in which a part of water has condensed, flows to the water extracting unit (150) (the first water filter (151) or the second water filter (152)), where condensation water is supplied to the humidifying section (160). As with the second embodiment, the condensation water supplied to the humidifying section (160) humidifies supply air in the humidifying tank (161), and the humidified supply air flows through the air path (135) and is supplied to the internal space.

Accordingly, also with the first modification, humidification and maintenance of the humidity of the internal space can be performed without receiving supply of water.

Second Modification

In the example shown in FIG. 12, the humidifying section (160) is connected to the supply pipe (120), water is added to supply air that flows in the supply pipe, which is the air path (135), and the supply air including the water is supplied to the internal space (5). However, in the humidifying section (160), independently from the supply pipe (120) that ejects supply air including water to the internal space, a spray mechanism (not shown), which sprays water stored in the humidifying tank (161) shown in FIG. 7 to the internal space, may be provided. In this case, in the humidifying section (160), a blow-out opening for humidified air (a distal end portion of the supply pipe (120): the air outflow pipe (164) shown in FIG. 7) and a water blow-out opening (a spray opening of the spray mechanism) are provided.

With such a configuration, the internal space can be humidified to a higher humidity than in a case where the spray mechanism is not provided.

Third Embodiment

A third embodiment will be described. In an internal air adjustment device (30) according to the third embodiment, the first composition adjuster (40) of the second embodiment is provided in the internal air adjustment device (30), while the second composition adjuster (60) is not provided; and only one system of the pump unit (35) and the composition adjuster (40) is provided. Descriptions of parts of the third embodiment that are the same as those of the second embodiment will be omitted. Although the circuit in which air-to-be-treated and supply air flow is only one system, the names of components of the second embodiment, which include "first" due to the presence of two systems, will be used without change.

Figure 17:
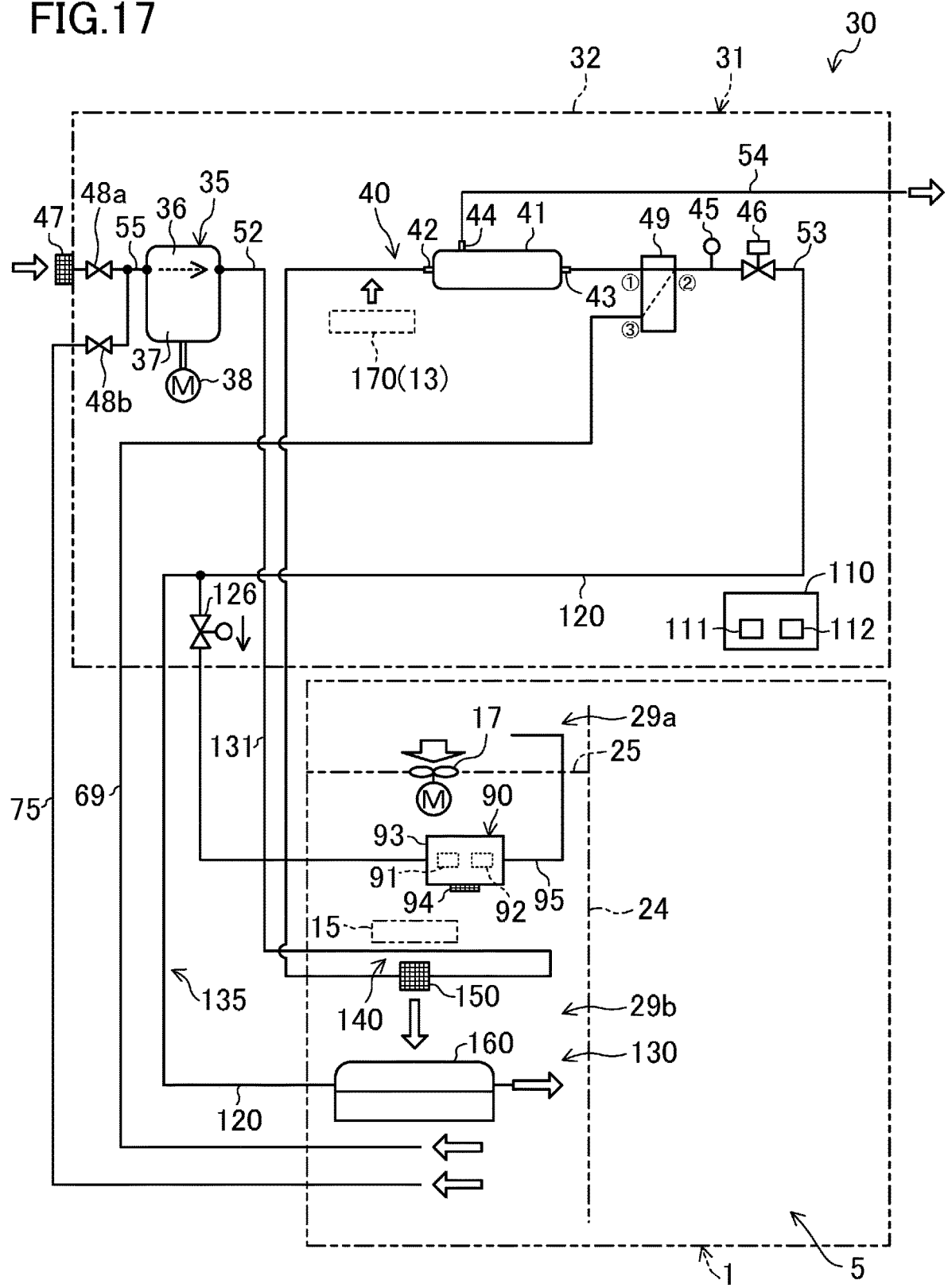
FIG. 17 is a piping diagram of an internal air adjustment device according to a third embodiment.

As illustrated in FIG. 17, in the external-side suction pipe (55), a first on-off valve (first electromagnetic valve) (48a) is provided between the air filter (47) and the pump unit (35). In contrast to the second embodiment, in the internal-side suction pipe (75), a second on-off valve (second electromagnetic valve) (48b) is provided and connected between the first on-off valve (first electromagnetic valve) (48a) and the pump unit (35). In the third embodiment, by opening one of the first on-off valve (first electromagnetic valve) (48a) and the second on-off valve (second electromagnetic valve) (48b) and closing the other, either external air or internal air can be treated by the composition adjuster (40) and supplied to the internal space.

In the first inlet pipe (52), the first bypass valve (50) of the second embodiment is not provided. The first inlet pipe (52) is connected to the first cooling pipe (131) and passes through the secondary passage (29b) of the internal air passage (29), returns to the unit case (32) of the internal air adjustment device (30), and is connected to the first separation module (41).

In the first cooling pipe (131), as with the second embodiment, the cooling unit (140) and the water extracting unit (150) are provided inside of the internal air passage (29), and the heating unit (170) is provided inside of the unit case (32). The humidifying unit (160) is provided in the supply pipe (120); and the cooling unit (140), the water extracting unit (150), and the humidifying unit (160) constitute the humidifying structure (130).

In contrast to the second embodiment, in the first primary-side pipe (53), a passage switching valve (49), which is configured similarly to the first bypass valve (50), is provided between the first separation module (41) and the first pressure sensor (45). The first port and the second port of the passage switching valve (49) are connected to the first primary-side pipe (53), and the third port of the passage switching valve (49) is connected to a circulation pipe (69). When the passage switching valve (49) is switched to a state in which the second port is connected to the third port, internal air that flows in the internal air passage (29) due to the internal fan (17) flows out of the circulation pipe (69), and returns to the internal air passage (29) through the supply pipe (120).

<<Provisional Calculation of Water Recovery Amount>>

Here, a water recovery amount, which is the amount of water recovered from external air by pressurizing and reducing the volume of external air, will be described.

When the pump unit (35) pressurizes external air to 300 kPa, the volume of the external air becomes about ¼ of that at the atmospheric pressure. As the volume decreases, the amount of water that can exist in a state of water vapor in the external air decreases, and the relative humidity exceeds 100% when the volume becomes ¼.

As an example, provisional calculations will be performed for conditions under which avocados are transported (internal temperature: 5° C., relative humidity: 80%). When it is assumed that the air temperature is 5° C., the pressure is 0 kPa, and the humidity is 80% RH on the suction side of the pump, the amount of water included in external air is 5.43 g/m³. When it is assumed that the air temperature is 5° C., the pressure is 300 kPa, and the humidity is 100% RH on the discharge side of the pump, the amount of water included in air is 1.70 g/m³=6.79 g/m³×volume ¼. In this case, the water discharge amount is 1.70 g/m³, and the recovery amount of water is 3.73 g/m³=5.43-1.70.

<External Air Conditions when Performing Humidification without Receiving Supply of Water>

The water recovery amount in each of a case where water discharged from the internal space is recovered and a case where the water is not recovered will be provisionally calculated.

Case of Second Embodiment (without Recovery of Water from the Internal Space)

Under the condition such that the water discharge amount is 5.43 g/m³, external air sucked by the pump needs to have a water vapor amount of 7.13 g/m³ (42% RH) or larger. To be specific, it is assumed as follows: on the suction side of the pump, the external air temperature is 20° C., the pressure is 0 kPa, and the humidity 42% RH (amount of water of 7.25 g/m³); and on the discharge side of the pump, the air temperature is 5° C., the pressure is 300 kPa, and the humidity is 100% RH (the amount of water is 6.79 g/m³× volume ¼). Then, the water recovery amount is 5.55 g/m³=7.25-1.70, which is larger than the aforementioned 5.43 g/m³.

Case of Third Embodiment (with Recovery of Water from the Internal Space)

Under the condition such that the water discharge amount is 1.70 g/m³, external air sucked by the pump needs to have a water vapor amount of 3.4 g/m³ (20% RH) or larger. To be specific, it is assumed as follows: on the suction side of the pump, the external air temperature is 20° C., the pressure is 0 kPa, and the humidity 20% RH (amount of water of 3.45 g/m³); and on the discharge side of the pump, the air temperature is 5° C., the pressure is 300 kPa, and the humidity is 100% RH (the amount of water is 6.79 g/m³× volume ¼). Then, the water recovery amount is 1.75 g/m³=3.45-1.70, which is larger than the aforementioned 1.70 g/m³.

Thus, the water recovery amount is larger than the water discharge amount in the third embodiment, and therefore the third embodiment is more effective than the second embodiment in view of maintenance of the freshness of plants and prevention of dew condensation in the separation membranes (85).

Fourth Embodiment

Figure 18:
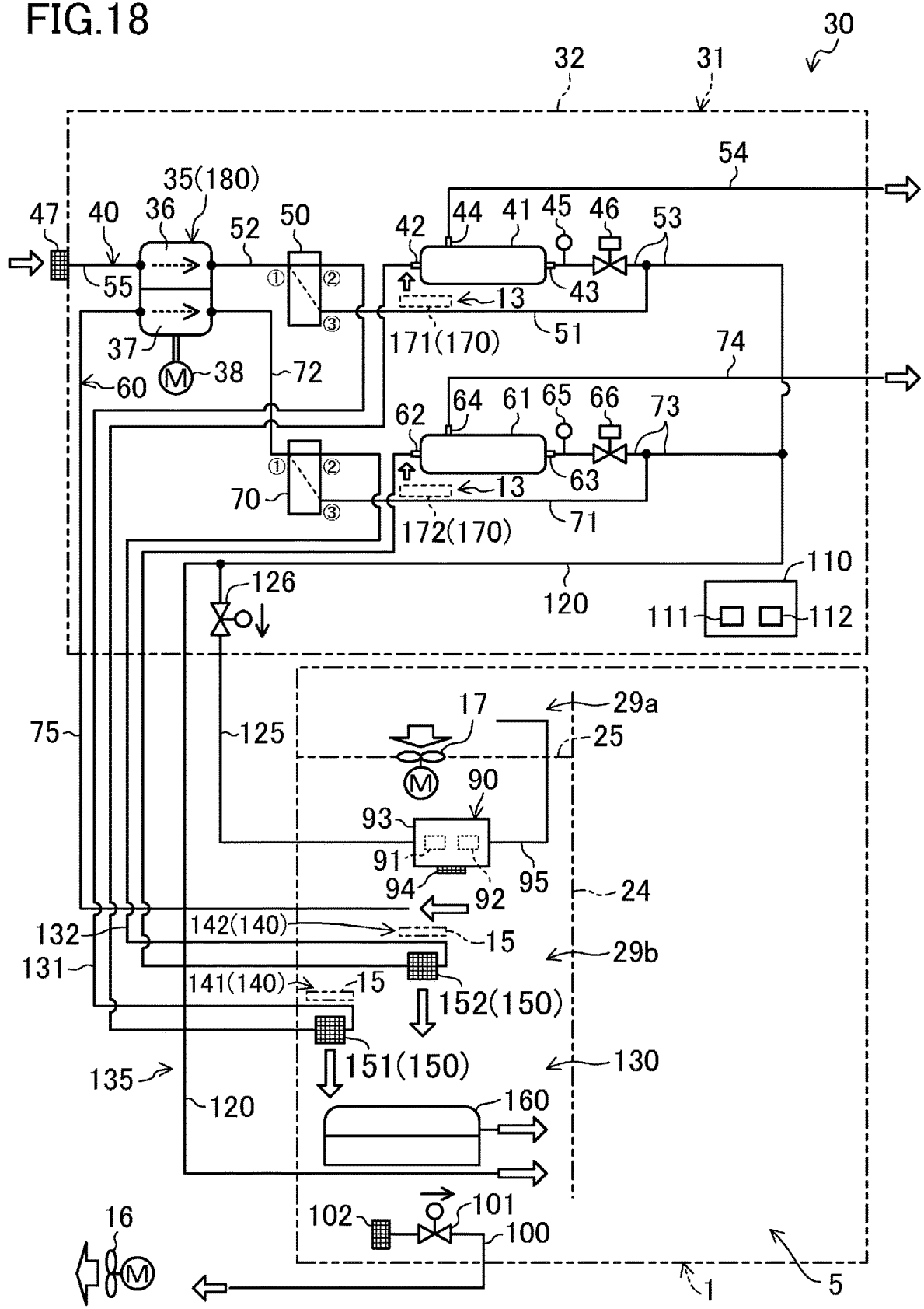
FIG. 18 is a piping diagram of an internal air adjustment device according to a fourth embodiment.

FIG. 18 illustrates a fourth embodiment. The internal air adjustment device (30) according to the fourth embodiment is an example in which the configuration of the humidifying unit (160) of the second embodiment is changed.

In the fourth embodiment, in contrast to the second embodiment, the humidifying unit (160) is not provided on the air path (135) but is provided independently from the supply pipe (120) without being connected to the supply pipe (120).

On the other hand, the humidifying section (160) is the same as that of the second embodiment in that the humidifying section (160) is configured to store water supplied from each water filter (water extracting unit) (150). For example, the humidifying section (160) is connected to each water filter (150) via a connection pipe (not shown). The humidifying section (160) has, for example, a spray mechanism (not shown) for directly supplying water in the humidifying tank (161) to the internal space (5). That is, in the fourth embodiment, the humidifying section (160) is configured, not to humidity the internal space (5) by providing water to supply air supplied to the internal space (5), but to directly humidify the internal space (5) by using the spray mechanism.

Also with the fourth embodiment, humidification and maintenance of the humidity of the internal space (5) can be performed as with the second and third embodiments, and thus decrease of the quality of plants due to drying of the plants can be suppressed.

The spray mechanism, which has been described in the second modification of the second embodiment, may be provided in a different manner, as appropriate, in accordance with the specific configuration of the humidifying section (160).

Other Embodiments

The internal air adjustment device (30) in each of the embodiments described above may be modified as follows.

First Modification

In the internal air adjustment device (30) according to the second embodiment, the separation membranes (85) of the first separation module (41) and the separation membranes (85) of the second separation module (61) may have characteristics that differ from each other.

Second Modification

In the internal air adjustment device (30) according to the present embodiment, the first bypass valve (50) may be configured to be capable of changing, in a stepwise manner or in a continuous manner, the ratio of the flow rate of untreated external air that flows into the first separation module (41) to the flow rate of untreated external air that flows into the first bypass pipe (51). The second bypass valve (70) may be configured to be capable of changing, in a stepwise manner or in a continuous manner, the ratio of the flow rate of untreated internal air that flows into the second separation module (61) to the flow rate of untreated external air that flows into the second bypass pipe (71).

Third Modification

In the internal air adjustment device (30) according to the second embodiment, a driving motor may be coupled to each of the first pump (36) and the second pump (37). With the present modification, it is possible to activate one of the first pump (36) and the second pump (37) and to stop the other.

Fourth Modification

In the internal air adjustment device (30) according to the second embodiment, each of the first composition adjuster (40) and the second composition adjuster (60) may be configured to separate sucked air-to-be-treated into two types of treated air, whose compositions differ from each other, by using a so-called pressure swing adsorption (PSA) method. In this case, each of the composition adjusters (40, 60) alternately and repeatedly perform: a step of generating treated air that has a low nitrogen concentration, a high oxygen concentration, and a high carbon dioxide concentration by causing nitrogen included in sucked air-to-be-treated to be adsorbed to an adsorbent; and a step generating treated air that has a high nitrogen concentration, a low oxygen concentration, a low carbon dioxide concentration by causing nitrogen to be desorbed from the adsorbent.

Fifth Modification

The internal air adjustment device (30) according to any of the embodiments described above may be provided in a stationary refrigerator or a stationary freezer. The internal air adjustment device (30) according to any of the embodiments described above may be provided in a refrigerator/freezer container for land transportation, which is transported by a truck or a railway. The internal air adjustment device (30) according to any of the embodiments described above may be provided in a refrigerator/freezer truck in which a box body that forms a freight chamber is integrated with a chassis. In each of the embodiments described above, an internal air adjustment device has been described. However, the application target of the present disclosure is not limited to an air composition adjustment device for an internal space of a container or the like, as long as the device is capable of adjusting the composition of air in a target space.

The embodiments and modifications described above may be modified in design and detail in various ways without departing from the spirit and scope of the claims. The embodiments and modifications described above may be combined or replaced as appropriate as long as they do not impair the function of the target of the present disclosure.

INDUSTRIAL APPLICABILITY

As described above, the present disclosure is useful for an air composition adjustment device.

EXPLANATION OF REFERENCES

1 transport container
5 freight chamber (target space, internal space)
10 container refrigerator
30 air composition adjustment device
40 first composition adjuster (composition adjuster)
41 first separation module (first separating unit)
60 second composition adjuster (composition adjuster)
61 second separation module (second separating unit)
85 separation membrane
135 air path
140 cooling unit
150 water extracting unit
160 humidifying unit
170 heating unit
180 pressurizing unit

The invention claimed is:

1. A humidifier for humidifying a target space, comprising:
   an air path through which water-extraction air to be supplied to the target space flows;
   an external path that cools the water-extraction air in the air path;
   a water removing filter that extracts water that is generated when the water-extraction air is cooled by the external path in the air path; and
   a humidifying unit that humidifies the target space by using the water extracted by the water removing filter,
   wherein the air path includes a main path that communicates with the target space and a discharge path that discharges a part or all of the water-extraction air to the outside of the target space,
   wherein the humidifier comprises a refrigerator that cools air in the target space, the refrigerator being located in the target space, and
   wherein the external path cools the water-extraction air by using the air in the target space cooled by the refrigerator.

2. The humidifier according to claim 1, comprising:
   a pump unit that compresses external air as the water-extraction air,
   wherein the external path cools the external air compressed by the pump unit.

3. The humidifier according to claim 2, wherein the pump unit is a pump unit including an air pump that compresses the external air and discharges air that has a temperature higher than a temperature of sucked external air.

4. The humidifier according to claim 1, wherein the main path includes an air-supply path that supplies air that flows in the main path to the humidifying unit.

5. The humidifier according to claim 1, wherein the external path includes a cooling heat exchanger that cools the external air by using a refrigerant of a refrigerant circuit included in the refrigerator.

6. The humidifier according to claim 1, wherein the air path includes a switching valve that switches flow of external air from the main path to the discharge path.

7. The humidifier according to claim 6, wherein, when a humidity of the target space is lower than a predetermined value, the switching valve is switched so that airflow in the air path is directed toward the main path, and, when the humidity of the target space is higher than or equal to the predetermined value, the switching valve is switched so that airflow in the air path is directed toward the discharge path.

8. An air composition adjustment device for adjusting composition of air in a target space, comprising:
   the humidifier according to claim 1; and
   a composition adjuster that includes a separating unit that separates, from air-to-be-treated, supply air having a composition different from a composition of the air-to-be-treated,
   wherein the main path of the air path includes a path through which the air-to-be-treated flows to the separating unit and a path through which the supply air generated in the separating unit flows to the target space,
   wherein the external path is configured to cool and dehumidify the air-to-be-treated or the supply air in the air path, wherein the water removing filter is configured to extract water generated by cooling the air-to-be-treated or the supply air that flows through the air path, and wherein the humidifying unit is configured to humidify the target space by using the water extracted by the water removing filter.

9. The air composition adjustment device according to claim 8, wherein the external path is disposed on an upstream side of the separating unit in the air path.

10. The air composition adjustment device according to claim 9, wherein, in the air path, a heating unit that heats the air-to-be-treated between the external path and the separating unit is provided.

11. The air composition adjustment device according to claim 8, wherein the separating unit is configured to separate the supply air from external air that is the air-to-be-treated, and wherein the humidifying unit is configured to humidify the supply air generated from the external air.

12. The air composition adjustment device according to claim 8, wherein the separating unit is configured to separate the supply air from internal air of the target space, the internal air being the air-to-be-treated, and wherein the humidifying unit is configured to humidify the supply air generated from the internal air.

13. The air composition adjustment device according to claim 8, wherein the separating unit includes a first separating unit that separates the supply air from external air that is first air-to-be-treated, and a second separating unit that separates the supply air from internal air of the target space, the internal air being second air-to-be-treated, and wherein the humidifying unit is configured to humidify the supply air generated from the external air and the supply air generated from the internal air.

14. The air composition adjustment device according to claim 8, wherein, in the air path, a pressurizing unit that pressurizes the air-to-be-treated on an upstream side of the external path is provided.

15. The air composition adjustment device according to claim 8, wherein the air-to-be-treated is internal air of a container including a refrigerator that cools the internal air, and wherein the external path is configured to cool the air-to-be-treated by using cold energy generated by the refrigerator.

16. The air composition adjustment device according to claim 8, wherein the separating unit includes a separation membrane that separates, from air-to-be-treated, supply air having a composition different from a composition of the air-to-be-treated.

* * * * *